United States Patent
Ukai et al.

(10) Patent No.: US 10,989,184 B2
(45) Date of Patent: Apr. 27, 2021

(54) ELECTROCHEMICAL HYDROGEN PUMP

(71) Applicant: Panasonic Intellectual Property Management Co., Ltd., Osaka (JP)

(72) Inventors: Kunihiro Ukai, Nara (JP); Hiromi Kita, Nara (JP); Takayuki Nakaue, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 114 days.

(21) Appl. No.: 16/442,578

(22) Filed: Jun. 17, 2019

(65) Prior Publication Data
US 2020/0011313 A1    Jan. 9, 2020

(30) Foreign Application Priority Data
Jul. 3, 2018 (JP) .............................. JP2018-126981

(51) Int. Cl.
    F04B 37/04    (2006.01)
    F04B 37/18    (2006.01)
    F04B 43/04    (2006.01)

(52) U.S. Cl.
    CPC .............. *F04B 37/04* (2013.01); *F04B 37/18* (2013.01); *F04B 43/046* (2013.01)

(58) Field of Classification Search
    CPC ......... F04B 43/046; F04B 37/04; F04B 37/18
    See application file for complete search history.

(56) References Cited

U.S. PATENT DOCUMENTS

| | | | |
|---|---|---|---|
| 10,301,179 B2 * | 5/2019 | Sakai | H01M 8/248 |
| 2006/0201800 A1 | 9/2006 | Nakazawa et al. | |
| 2006/0234105 A1 * | 10/2006 | Suh | H01M 8/248 |
| | | | 429/423 |
| 2011/0177418 A1 * | 7/2011 | Kozu | H01M 8/2415 |
| | | | 429/455 |
| 2011/0236792 A1 * | 9/2011 | Kawashima | H01M 8/0258 |
| | | | 429/492 |
| 2018/0155193 A1 * | 6/2018 | Sakai | H01M 8/248 |

FOREIGN PATENT DOCUMENTS

| | | |
|---|---|---|
| JP | 2006-070322 | 3/2006 |
| JP | 2006-233297 | 9/2006 |
| JP | 2006-307248 | 11/2006 |

* cited by examiner

*Primary Examiner* — Patrick Hamo
(74) *Attorney, Agent, or Firm* — McDermott Will and Emery LLLP

(57) ABSTRACT

An electrochemical hydrogen pump includes a hydrogen pump unit including an electrolyte film, an anode catalyst layer, a cathode catalyst layer, an anode gas diffusion layer, an anode separator, a cathode gas diffusion layer, and a cathode separator, a first end plate and a second end plate, a fastener, and a voltage applicator. The electrochemical hydrogen pump transfers and pressurizes hydrogen on the cathode catalyst layer, when a voltage is applied by the voltage applicator. Cathode gas flow channels in which the cathode gas flows are connected to each other. The amount of thickness reduction of the cathode gas diffusion layer due to compression resulting from fastening of the fastener is larger in the hydrogen pump unit positioned at at least one end of the stacked hydrogen pump units than in the hydrogen pump unit positioned at neither end of the stacked hydrogen pump units.

8 Claims, 8 Drawing Sheets

ELECTROCHEMICAL HYDROGEN PUMP

BACKGROUND

1. Technical Field

The present disclosure relates to an electrochemical hydrogen pump.

2. Description of the Related Art

Considering environmental problems, such as global warming, and energy problems, such as depletion of oil resources, hydrogen has been focused on as a clean alternative energy source in place of fossil fuels. Essentially, burning hydrogen produces only water, carbon dioxide, which contributes to global warming, is not produced, and few quantities of other compounds, such as nitrogen oxides, are produced. Thus, hydrogen is anticipated as a clean energy source. Fuel cells, an example of devices that use hydrogen highly efficiently as a fuel, have been developed and widely used for automotive power sources and home power generation.

In an upcoming hydrogen society, development of technology for storing hydrogen at high density and transporting and using hydrogen in a reduced volume at low cost are required in addition to development of technology for producing hydrogen. In particular, to encourage the spread of such fuel cells as distributed energy sources, a hydrogen supply infrastructure needs to be established. Furthermore, various suggestions, such as methods for producing and purifying hydrogen and storing purified hydrogen at high density, have been made to provide a stable hydrogen supply.

For example, Japanese Unexamined Patent Application Publication No. 2006-70322 suggests a high-pressure hydrogen producing apparatus. The high-pressure hydrogen producing apparatus includes a stack of a solid polymer electrolyte film, a power feeder, and a separator, with the stack sandwiched between end plates and fastened by fastening bolts passing through the endplates. In the high-pressure hydrogen producing apparatus, when a difference between the pressure applied to the cathode power feeder on the high-pressure side and the pressure applied to the anode power feeder on the low-pressure side increases to a predetermined value or higher, the solid polymer electrolyte film and the anode power feeder on the low-pressure side deform. As a result, the contact resistance between the cathode power feeder on the high-pressure side and the solid polymer electrolyte film increases.

Thus, the high-pressure hydrogen producing apparatus of Japanese Unexamined Patent Application Publication No. 2006-70322 includes a pressing unit, such as a disc spring or a coil spring, that presses the cathode power feeder on the high-pressure side to make the cathode power feeder adhere to the solid polymer electrolyte film if the solid polymer electrolyte film and the anode power feeder on the low-pressure side deform. Accordingly, an increase in the contact resistance between the cathode power feeder on the high-pressure side and the solid polymer electrolyte film is suppressed.

SUMMARY

In the prior example, however, an increase in the contact resistance between the cathode separator and the cathode power feeder in a case where the gas pressure of the cathode increases is not fully investigated.

One non-limiting and exemplary embodiment provides an electrochemical hydrogen pump that can readily and appropriately suppress an increase in the contact resistance between the members in a hydrogen pump unit, compared with that in the prior art.

In one general aspect, the techniques disclosed here feature an electrochemical hydrogen pump including a hydrogen pump unit including an electrolyte film, an anode catalyst layer disposed on one main surface of the electrolyte film, a cathode catalyst layer disposed on the other main surface of the electrolyte film, an anode gas diffusion layer disposed on the anode catalyst layer, an anode separator disposed on the anode gas diffusion layer, a cathode gas diffusion layer disposed on the cathode catalyst layer, and a cathode separator disposed on the cathode gas diffusion layer, a first end plate and a second end plate that are disposed on respective ends of at least three or more of the hydrogen pump units stacked on each other in a stacking direction, a fastener that fastens the first end plate and the second end plate to compress the hydrogen pump unit in the stacking direction; and a voltage applicator that applies a voltage between the anode catalyst layer and the cathode catalyst layer. The electrochemical hydrogen pump transfers, to the cathode catalyst layer, hydrogen in the hydrogen-containing gas that has been supplied to the anode catalyst layer and pressurizes the hydrogen, when a voltage is applied by the voltage applicator. Cathode gas flow channels in which the cathode gas flowing out from the cathode gas diffusion layer in each of the at least three or more hydrogen pump units stacked on each other flows are connected to each other. The amount of thickness reduction of the cathode gas diffusion layer due to compression resulting from fastening of the fastener is larger in the hydrogen pump unit positioned at at least one end of the stacked hydrogen pump units than in the hydrogen pump unit positioned at neither end of the stacked hydrogen pump units.

An electrochemical hydrogen pump according to one aspect of the present disclosure can readily and appropriately suppress an increase in the contact resistance between the members in the hydrogen pump units.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

In the high-pressure hydrogen producing apparatus of Japanese Unexamined Patent Application Publication No. 2006-70322, the stack is fastened by fastening bolts passing through end plates and compressed in a stacking direction. However, the inventors conducted thorough investigation and found that due to the high gas pressure of the cathode, the cathode separator deforms so as to curve toward the neighboring end plate and that accordingly, the end plate also deforms so as to curve outward away from the stack. In a plurality of such stacks, the separator positioned at the end of the plurality of stacks in a stacking direction deforms so as to curve toward the neighboring end plate. Accordingly, with the deformation of the separator, the end plate deforms as described above.

With the above deformation of the cathode separator, a gap larger than the gap described in paragraph [0020] of Japanese Unexamined Patent Application Publication No. 2006-70322 is generated between the cathode separator and the cathode power feeder. To fill such a gap, the distance of the disc spring electrically connecting the cathode power feeder and the cathode separator to each other increases, and thus, the electrical resistance of the disc spring increases.

The foregoing can be seen not only in the high-pressure hydrogen producing apparatus of Japanese Unexamined Patent Application Publication No. 2006-70322, but also in an electrochemical hydrogen pump in a prior patent of the applicant.

Figure 1A:
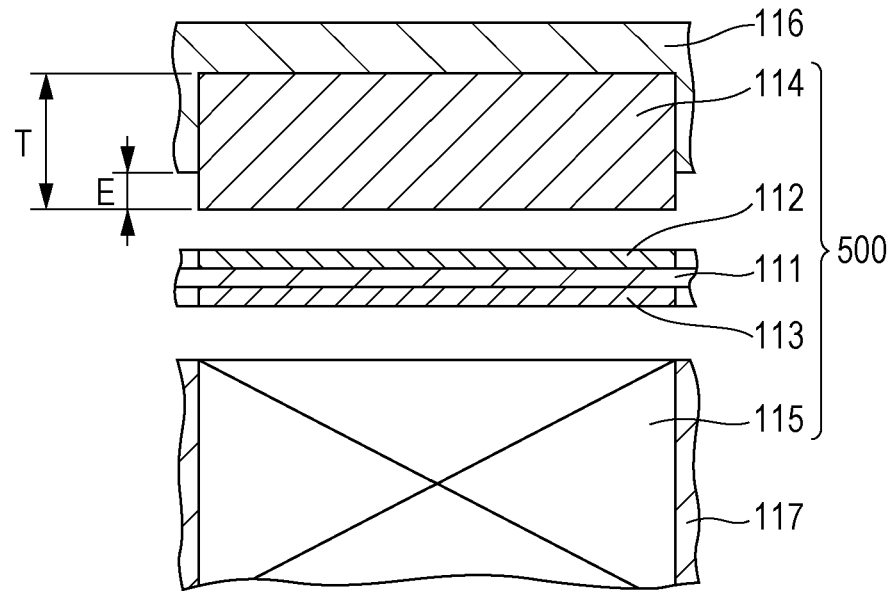
FIG. 1A is a view of an exemplary electrochemical hydrogen pump.

For example, as illustrated in FIG. 1A, a structure is suggested in which a cathode gas diffusion layer 114 is placed in the recess of a cathode separator 116 and in which, before a stack 500 of an electrolyte film 111, a cathode catalyst layer 112, an anode catalyst layer 113, the cathode gas diffusion layer 114, and an anode gas diffusion layer 115 is fastened, a portion of the cathode gas diffusion layer 114 protrudes by a predetermined amount E from the recess in a thickness direction.

Figure 1B:
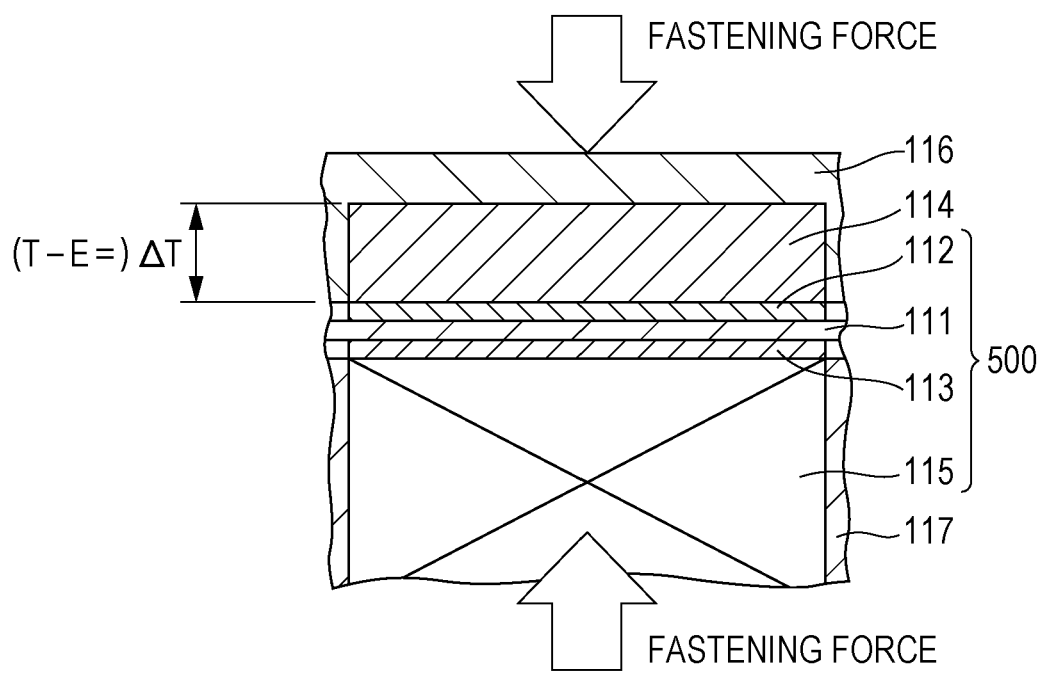
FIG. 1B is a view of the exemplary electrochemical hydrogen pump.

When the stack 500 is fastened, the cathode gas diffusion layer 114 elastically deforms by the amount of protrusion in the thickness direction, as illustrated in FIG. 1B.

During the operation of the electrochemical hydrogen pump, when the gas pressure of the cathode gas diffusion layer 114 in the stack 500 increases, a high pressure is applied to the anode gas diffusion layer 115, the anode catalyst layer 113, and the electrolyte film 111, since the electrolyte film 111 does not allow gas permeation. Then, the anode gas diffusion layer 115, the anode catalyst layer 113, and the electrolyte film 111 are each compressed and deform. At this time, the cathode gas diffusion layer 114 elastically deforms in a direction in which the thickness $\Delta T$, which is the thickness after compression due to the fastener, returns to thickness T, which is the thickness before the compression. Thus, the contact between the cathode catalyst layer 112 and the cathode gas diffusion layer 114 can be appropriately maintained.

When the gas pressure of the cathode increases, however, the cathode separator 116 deforms so as to curve toward the neighboring end plate not shown (outward), as described above, and thus, a gap is likely to be generated between the bottom surface of the recess of the cathode separator 116 and the cathode gas diffusion layer 114. Then, the contact resistance therebetween may increase. As a result, a voltage applied by a voltage applicator may increase, and this may cause degradation of the operation efficiency of the electrochemical hydrogen pump.

The inventors conceived an idea of further increasing the amount of protrusion E of the cathode gas diffusion layer 114, in consideration of the amount of deformation of the cathode separator 116, to reliably obtain the electrical contact between the cathode separator 116 and the cathode gas diffusion layer 114 and achieved the following one aspect of the present disclosure.

Such a problem occurs not only in the example in the above prior patent of the applicant, but also in a structure in which a cathode gas diffusion layer is disposed on the flat surface of a cathode separator having no recess.

In other words, an electrochemical hydrogen pump according to a first aspect of the present disclosure includes:
a hydrogen pump unit including an electrolyte film, an anode catalyst layer disposed on one main surface of the electrolyte film, a cathode catalyst layer disposed on the other main surface of the electrolyte film, an anode gas diffusion layer disposed on the anode catalyst layer, an anode separator disposed on the anode gas diffusion layer, a cathode gas diffusion layer disposed on the cathode catalyst layer, and a cathode separator disposed on the cathode gas diffusion layer;
a first end plate and a second end plate that are disposed on respective ends of at least three or more of the hydrogen pump units stacked on each other in a stacking direction;
a fastener that fastens the first end plate and the second end plate to compress the hydrogen pump unit in the stacking direction; and
a voltage applicator that applies a voltage between the anode catalyst layer and the cathode catalyst layer, the electrochemical hydrogen pump transferring, to the cathode catalyst layer, hydrogen in the hydrogen-containing gas that has been supplied to the anode catalyst layer and pressurizing the hydrogen, when a voltage is applied by the voltage applicator,
wherein cathode gas flow channels in which the cathode gas flowing out from the cathode gas diffusion layer in each of the at least three or more hydrogen pump units stacked on each other flows are connected to each other, and
the amount of thickness reduction of the cathode gas diffusion layer due to compression resulting from fastening of the fastener is larger in the hydrogen pump unit positioned at at least one end of the stacked hydrogen pump units than in the hydrogen pump unit positioned at neither end of the stacked hydrogen pump units.

According to such a structure, the electrochemical hydrogen pump according to the present aspect can readily and appropriately suppress an increase in the contact resistance between the members in the hydrogen pump units, compared with that in the prior art.

Specifically, in a hydrogen pump unit positioned at at least one end of the stacked hydrogen pump units, when the gas pressure of the cathode gas diffusion layer increases, the separator in the hydrogen pump unit deforms so as to curve toward the end plate (outward).

For example, when the gas pressure of the cathode gas diffusion layer increases, the cathode separator in the hydrogen pump unit adjacent to the cathode end plate deforms so as to curve toward the cathode end plate (outward). Then, in such a hydrogen pump unit, a gap is likely to be generated between the cathode separator and the cathode gas diffusion layer.

For example, when the gas pressure of the cathode gas diffusion layer increases, a pressure is applied to the anode separator in the hydrogen pump unit adjacent to the anode end plate through the anode gas diffusion layer. Thus, the anode separator deforms so as to curve toward the anode end plate (outward). Then, in such a hydrogen pump unit, a gap is likely to be generated between the cathode gas diffusion layer and the electrolyte film (in the cathode catalyst layer).

However, in the electrochemical hydrogen pump according to the present aspect, the amount of thickness reduction of the cathode gas diffusion layer due to compression resulting from fastening of the fastener is larger in a hydrogen pump unit positioned at at least one end of the stacked hydrogen pump units than in the hydrogen pump unit positioned at neither end of the stacked hydrogen pump units, which may be simply referred to as the hydrogen pump unit in the middle portion hereinafter.

Thus, if the cathode separator deforms so as to curve toward the cathode end plate (outward), the cathode gas diffusion layer in the hydrogen pump unit adjacent to the cathode end plate can elastically deform in a direction in which the thickness after the compression due to the fastener returns to the original thickness before the compression, so as to follow the deformation of the cathode separator. Accordingly, the electrochemical hydrogen pump according to the present aspect can reduce the risk of gap generation between the cathode separator and the cathode gas diffusion layer. As a result, the electrochemical hydrogen pump according to the present aspect can readily and appropriately suppress an increase in the contact resistance between the cathode separator and the cathode gas diffusion layer in the above hydrogen pump unit.

If the anode separator deforms so as to curve toward the anode end plate (outward), the cathode gas diffusion layer in the hydrogen pump unit adjacent to the anode end plate can elastically deform in a direction in which the thickness after the compression due to the fastener returns to the original thickness before the compression, so as to follow the deformation of the anode separator. Accordingly, the electrochemical hydrogen pump according to the present aspect can reduce the risk of gap generation between the cathode gas diffusion layer and the electrolyte film. As a result, the electrochemical hydrogen pump according to the present aspect can readily and appropriately suppress an increase in the contact resistance between the cathode gas diffusion layer and the electrolyte film in the above hydrogen pump unit.

In the electrochemical hydrogen pump according to the present aspect, the cathode gas flow channels in which the cathode gas flowing out from the cathode gas diffusion layer in each of the hydrogen pump units flows are connected to each other. Thus, the high-pressure hydrogen-containing gas in the hydrogen pump units sandwiching the hydrogen pump unit in the middle portion suppresses the deformation of the members in the hydrogen pump unit in the middle portion.

Accordingly, when the amount of thickness reduction of the cathode gas diffusion layer due to compression resulting from fastening of the fastener is smaller in the hydrogen pump unit in the middle portion than in the hydrogen pump unit positioned at at least one end of the stacked hydrogen pump units, a gap is unlikely to be generated between the members in the hydrogen pump unit in the middle portion. In other words, when the amount of elastic deformation of the cathode gas diffusion layer in a direction in which the thickness after the compression due to the fastener returns to the original thickness before the compression is smaller in the hydrogen pump unit in the middle portion than in the hydrogen pump unit positioned at at least one end of the stacked hydrogen pump units, the risk of gap generation between the members in the hydrogen pump unit in the middle portion can be reduced. The electrical resistance of the hydrogen pump unit in the middle portion in the thickness direction is lower in the electrochemical hydrogen pump according to the present aspect than in an electrochemical hydrogen pump in which the thickness of the cathode gas diffusion layer in the hydrogen pump unit in the middle portion is identical to the thickness of the cathode gas diffusion layers in the hydrogen pump units at both ends. Accordingly, the amount of heat generation is smaller in the electrochemical hydrogen pump according to the present aspect than in an electrochemical hydrogen pump in which the thickness of the cathode gas diffusion layer in the hydrogen pump unit in the middle portion is identical to the thickness of the cathode gas diffusion layers in the hydrogen pump units at both ends. When cathode gas diffusion layers having an identical elastic modulus are used in the hydrogen pump units at both ends and the hydrogen pump unit in the middle portion, the cathode gas diffusion layer is thinner in the hydrogen pump unit in the middle portion than in the hydrogen pump units at both ends in the electrochemical hydrogen pump according to the present aspect. In addition, the hydrogen pump unit in the middle portion is thinner than the hydrogen pump units at both ends. Therefore, the electrochemical hydrogen pump according to the present aspect can be thinner and lighter than an electrochemical hydrogen pump in which the thickness of the cathode gas diffusion layer in the hydrogen pump unit in the middle portion is identical to the thickness of the cathode gas diffusion layers in the hydrogen pump units at both ends.

Accordingly, the electrochemical hydrogen pump according to the present aspect can readily and appropriately suppress an increase in the contact resistance of the members in the hydrogen pump unit in the middle portion.

An electrochemical hydrogen pump according to a second aspect of the present disclosure is the electrochemical hydrogen pump according to the first aspect, in which, before fastening of the fastener, the thickness of the cathode gas diffusion layer may be larger in the hydrogen pump unit positioned at at least one end of the stacked hydrogen pump units than in the hydrogen pump unit positioned at neither end of the stacked hydrogen pump units.

An electrochemical hydrogen pump according to a third aspect of the present disclosure is the electrochemical hydrogen pump according to the first aspect, in which the cathode separator may have a recess in which the cathode gas diffusion layer is disposed and in which, before fastening of the fastener, the thickness of a portion of the cathode gas diffusion layer that protrudes from the recess of the cathode separator may be larger in the hydrogen pump unit positioned at at least one end of the stacked hydrogen pump units than in the hydrogen pump unit positioned at neither end of the stacked hydrogen pump units.

According to such a structure, in the electrochemical hydrogen pump according to the present aspect, the amount of thickness reduction of the cathode gas diffusion layer due to compression resulting from fastening of the fastener can be appropriately larger in the hydrogen pump unit positioned at at least one end of the stacked hydrogen pump units than in the hydrogen pump unit in the middle portion.

An electrochemical hydrogen pump according to a fourth aspect of the present disclosure is the electrochemical hydrogen pump according to the third aspect, in which the depth of the recess of the cathode separator may be smaller in the hydrogen pump unit positioned at at least one end of the stacked hydrogen pump units than in the hydrogen pump unit positioned at neither end of the stacked hydrogen pump units.

According to such a structure, in the electrochemical hydrogen pump according to the present aspect, when the cathode gas diffusion layers in the hydrogen pump units have an identical thickness, the amount of thickness reduction of the cathode gas diffusion layer due to compression resulting from fastening of the fastener can be appropriately larger in the hydrogen pump unit positioned at at least one end of the stacked hydrogen pump units than in the hydrogen pump unit in the middle portion.

An electrochemical hydrogen pump according to a fifth aspect of the present disclosure is any one of the electrochemical hydrogen pumps according to the first to fourth aspects, in which the cathode gas diffusion layer in the hydrogen pump unit positioned at at least one end of the stacked hydrogen pump units includes a first main surface that is adjacent to the cathode separator, and a protrusion may be provided on the first main surface of the cathode gas diffusion layer.

As described above, when the gas pressure of the cathode gas diffusion layer in the hydrogen pump unit adjacent to the cathode end plate increases, the cathode separator in such a hydrogen pump unit deforms so as to curve toward the cathode end plate (outward). Then, a main surface of the cathode separator adjacent to the cathode gas diffusion layer deforms due to the high-pressure hydrogen-containing gas such that the amount of deformation in the center portion is larger than the amount of deformation in the end portions. In other words, the main surface of the cathode separator deforms to have a dome shape due to the high-pressure hydrogen-containing gas.

Such a phenomenon occurs in cathode separators having a recess in which a cathode gas diffusion layer is disposed and in cathode separators having no recesses.

In the electrochemical hydrogen pump in the present aspect, the cathode gas diffusion layer has a protrusion on a main surface thereof that is adjacent to the cathode separator. Thus, the main surface of the cathode gas diffusion layer is likely to adhere to the main surface of the cathode separator, which deforms to have a dome shape due to the high-pressure hydrogen-containing gas. Therefore, the electrochemical hydrogen pump according to the present aspect can reduce the risk of gap generation between the cathode separator and the cathode gas diffusion layer, compared with an electrochemical hydrogen pump in which the cathode gas diffusion layer does not have a protrusion on the main surface thereof.

The electrical resistance of the cathode gas diffusion layer in the thickness direction is proportional to the thickness of the cathode gas diffusion layer. The amount of thickness reduction of the cathode gas diffusion layer due to compression resulting from fastening of the fastener is larger in the hydrogen pump unit positioned at at least one end of the stacked hydrogen pump units than in the hydrogen pump unit in the middle portion. Therefore, the electrical resistance of the cathode gas diffusion layer in the thickness direction is more likely to decrease in the hydrogen pump unit positioned at at least one end of the stacked hydrogen pump units than in the hydrogen pump unit in the middle portion, with fastening of the fastener.

Considering the foregoing, an electrochemical hydrogen pump according to a sixth aspect of the present disclosure is any one of the electrochemical hydrogen pumps according to the first to fifth aspects, in which, before fastening of the fastener, the electrical resistance of the cathode gas diffusion layer in the thickness direction may be higher in the hydrogen pump unit positioned at at least one end of the stacked hydrogen pump units than in the hydrogen pump unit positioned at neither end of the stacked hydrogen pump units.

According to such a structure, the electrochemical hydrogen pump according to the present aspect is likely to equalize the electrical resistances of the cathode gas diffusion layers in the thickness direction in the hydrogen pump units during fastening of the fastener.

In other words, decreases in the electrical resistance of the cathode gas diffusion layers in the thickness direction in the hydrogen pump units vary due to fastening of the fastener; however, in the electrochemical hydrogen pump according to the present aspect, such a variation can be reduced because the electrical resistances of the cathode gas diffusion layers in the thickness direction in the hydrogen pump units are unequal before fastening of the fastener. Therefore, during fastening of the fastener, the electrochemical hydrogen pump according to the present aspect is more likely to equalize the electrical resistances of the cathode gas diffusion layers in the thickness direction in the hydrogen pump units than an electrochemical hydrogen pump in which, before fastening of the fastener, the electrical resistances of the cathode gas diffusion layers in the thickness direction in the hydrogen pump units are equal.

An electrochemical hydrogen pump according to a seventh aspect of the present disclosure is any one of the electrochemical hydrogen pumps according to the first to sixth aspects, in which, the hydrogen pump units includes a first end hydrogen pump unit and a second end hydrogen pump unit at ends of the hydrogen pump units, between the first end plate and the first end hydrogen pump unit that is adjacent to the first end plate, a first space that stores the hydrogen-containing gas discharged from the cathode gas flow channel may be formed, and the amount of thickness reduction of the cathode gas diffusion layer due to compression resulting from fastening of the fastener may be larger in the second end hydrogen pump unit than in the first end hydrogen pump unit.

The pressure of the hydrogen-containing gas in the first space formed between the hydrogen pump unit positioned at an end of the stacked hydrogen pump units adjacent to the first end plate (hereinafter, hydrogen pump unit adjacent to the first end plate) and the first end plate is high and nearly identical to the pressure of the hydrogen-containing gas in the cathode of the hydrogen pump unit. Accordingly, a load is applied to the separator in the hydrogen pump unit adjacent to the first end plate by the hydrogen-containing gas in the first space so as to suppress the deformation (flexure) of the separator due to the pressure of the hydrogen-containing gas in the cathode.

On the other hand, between the hydrogen pump unit positioned at an end of the stacked hydrogen pump units adjacent to the second end plate (hereinafter, hydrogen pump unit adjacent to the second end plate) and the second end plate, there is no space that stores the high-pressure hydrogen-containing gas having a pressure nearly identical to the pressure of the hydrogen-containing gas in the cathode in the hydrogen pump unit. Thus, a load that can suppress deformation (flexure) of the separator due to the pressure of the hydrogen-containing gas in the cathode is not applied to the separator in the hydrogen pump unit adjacent to the second end plate. In other words, due to the pressure of the hydrogen-containing gas in the cathode in the hydrogen pump unit, a gap is more likely to be generated between the members in the hydrogen pump unit adjacent to the second end plate than in the hydrogen pump unit adjacent to the first end plate.

Considering the foregoing, in the electrochemical hydrogen pump according to the present aspect, the amount of thickness reduction of the cathode gas diffusion layer due to compression resulting from fastening of the fastener is larger in the hydrogen pump unit adjacent to the second end plate than in the hydrogen pump unit adjacent to the first end plate. Thus, the risk of gap generation between the members in the hydrogen pump unit adjacent to the second end plate can be reduced.

An electrochemical hydrogen pump according to an eighth aspect of the present disclosure is any one of the electrochemical hydrogen pumps according to the first to sixth aspect, in which, the hydrogen pump units includes a first end hydrogen pump unit and a second end hydrogen pump unit at ends of the hydrogen pump units, between the second end plate and the second end hydrogen pump unit that is adjacent to the second end plate, a second space that stores the hydrogen-containing gas discharged from the cathode gas flow channel is formed, and the amount of thickness reduction of the cathode gas diffusion layer due to compression resulting from fastening of the fastener is larger in the first end hydrogen pump unit than in the second end hydrogen pump unit.

The pressure of the hydrogen-containing gas in the second space formed between the hydrogen pump unit adjacent to the second end plate and the second end plate is high and nearly identical to the pressure of the hydrogen-containing gas in the cathode of the hydrogen pump unit. Accordingly, a load is applied to the separator in the hydrogen pump unit adjacent to the second end plate by the hydrogen-containing gas in the second space so as to suppress deformation (flexure) of the separator due to the pressure of the hydrogen-containing gas in the cathode.

On the other hand, between the hydrogen pump unit adjacent to the first end plate and the first end plate, there is no space that stores the high-pressure hydrogen-containing gas having a pressure nearly identical to the pressure of the hydrogen-containing gas in the cathode in the hydrogen pump unit. Thus, a load that can suppress deformation (flexure) of the separator due to the pressure of the hydrogen-containing gas in the cathode is not applied to the separator in the hydrogen pump unit adjacent to the first end plate. In other words, due to the pressure of the hydrogen-containing gas in the cathode in the hydrogen pump unit, a gap is more likely to be generated between the members in the hydrogen pump unit adjacent to the first end plate than in the hydrogen pump unit adjacent to the second end plate.

In the electrochemical hydrogen pump according to the present aspect, the amount of thickness reduction of the cathode gas diffusion layer due to compression resulting from fastening of the fastener is larger in the hydrogen pump unit adjacent to the first end plate than in the hydrogen pump unit adjacent to the second end plate. Thus, the risk of gap generation between the members in the hydrogen pump unit adjacent to the first end plate can be reduced.

Hereinafter, with reference to the drawings, embodiments of the present disclosure will be described. The embodiments described below each illustrate an example of the above aspects. Thus, shapes, materials, components, and the positions and connection modes of the components, which will be described below, are examples and do not limit the above aspects provided that they are not described in Claims. Among the components described below, components not described in the independent Claim showing the broadest concept of the above aspects are described as optional components. In the drawings, description of one of components with the same symbol may be omitted. In the drawings, the components are schematically drawn to facilitate the understanding, so that shapes and dimensional ratios in the drawings may differ from those of actual components.

First Embodiment

Device Structure

Figure 2A:
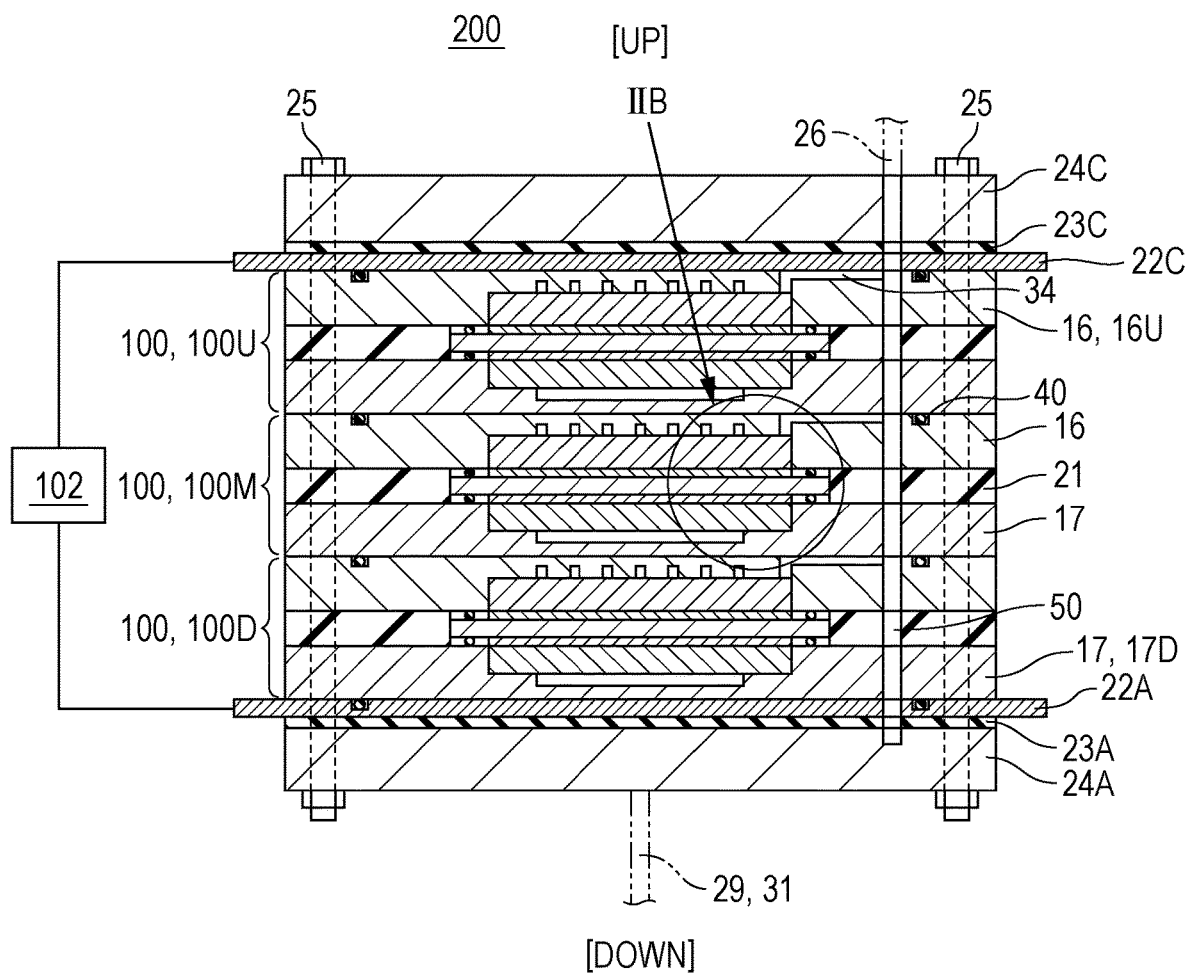
FIG. 2A is a view of an exemplary electrochemical hydrogen pump according to a first embodiment.
Figure 2B:
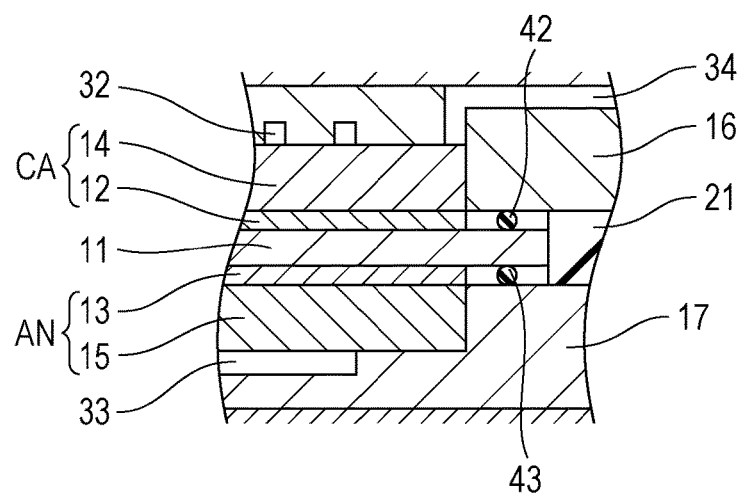
FIG. 2B is an enlarged view of portion IIB in FIG. 2A.
Figure 3A:
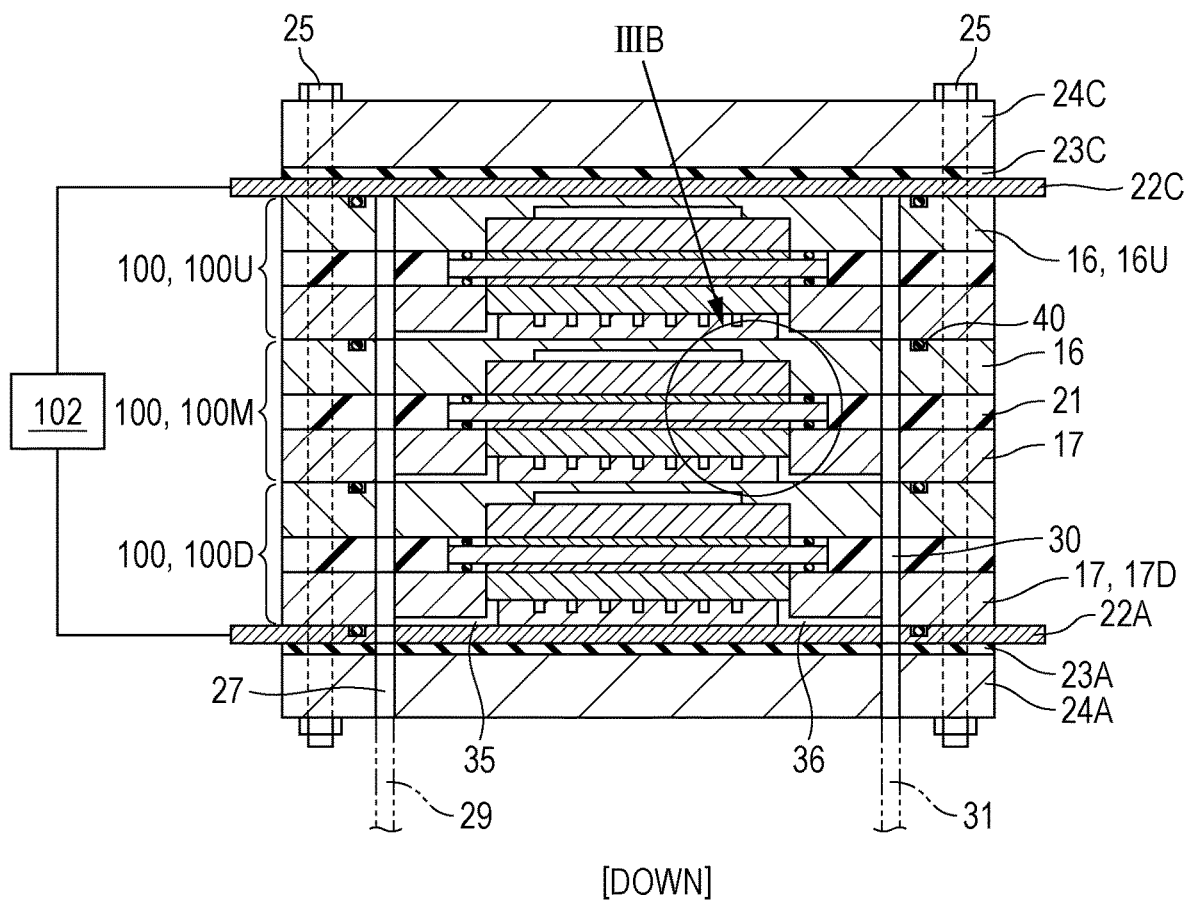
FIG. 3A is a view of an exemplary electrochemical hydrogen pump according to the first embodiment.
Figure 3B:
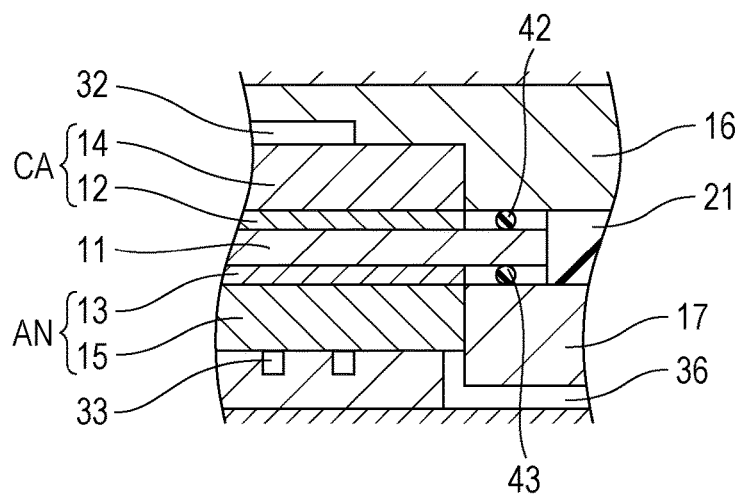
FIG. 3B is an enlarged view of portion IIIB in FIG. 3A.

FIG. 2A and FIG. 3A are each a view of electrochemical hydrogen pumps according to the first embodiment. FIG. 2B is an enlarged view of portion IIB in FIG. 2A. FIG. 3B is an enlarged view of portion IIIB in FIG. 3A.

FIG. 2A is a vertical cross-sectional view of an electrochemical hydrogen pump 200 including a straight line passing through the center of the electrochemical hydrogen pump 200 and the center of a cathode gas exhaust manifold 50 in plane view. FIG. 3A is a vertical cross-sectional view of the electrochemical hydrogen pump 200 including a straight line passing through the center of the electrochemical hydrogen pump 200, the center of an anode gas intake manifold 27, and the center of an anode gas exhaust manifold 30 in plane view.

Figure 7:
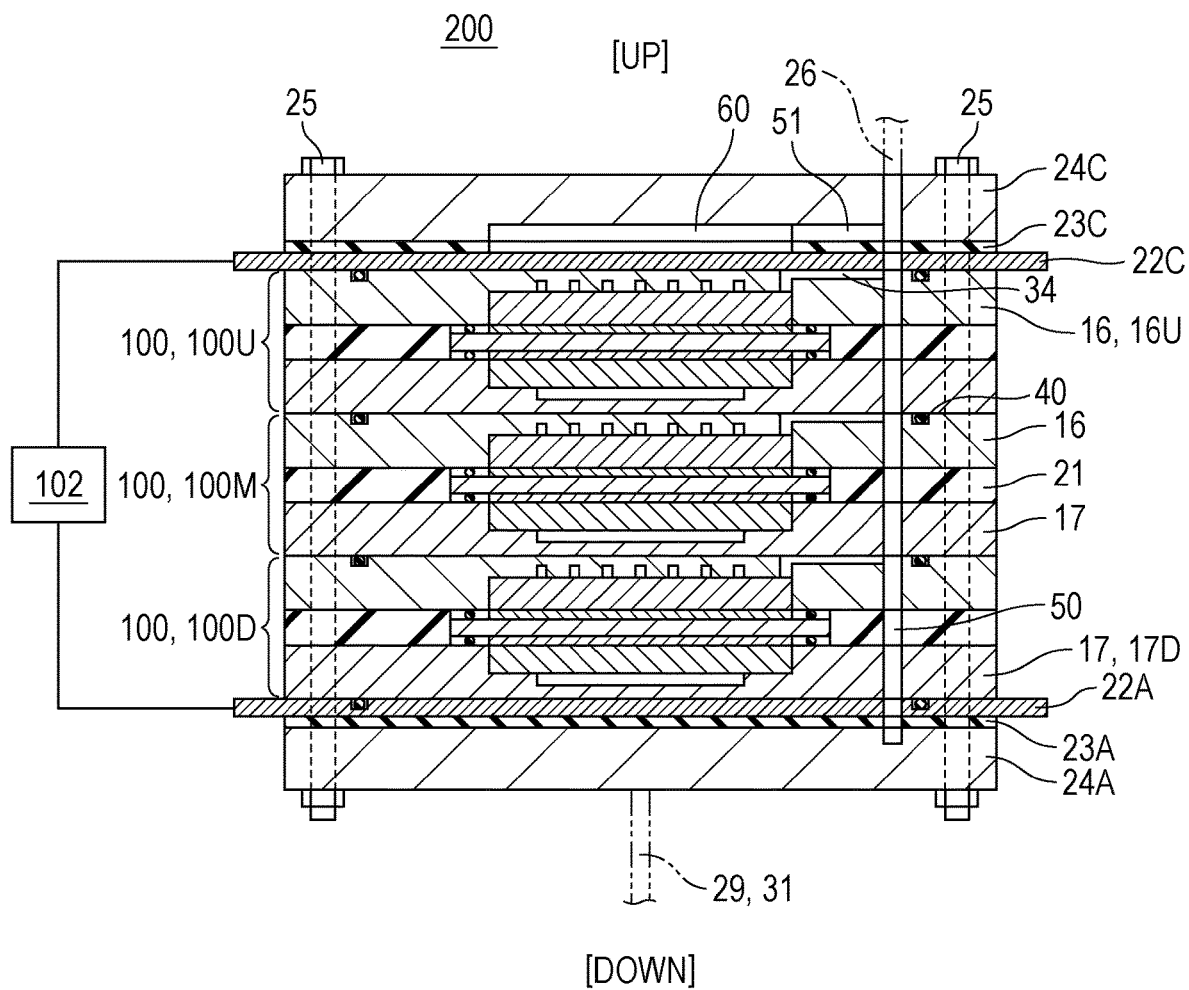
FIG. 7 is a view of an exemplary electrochemical hydrogen pump according to a second embodiment.
Figure 8:
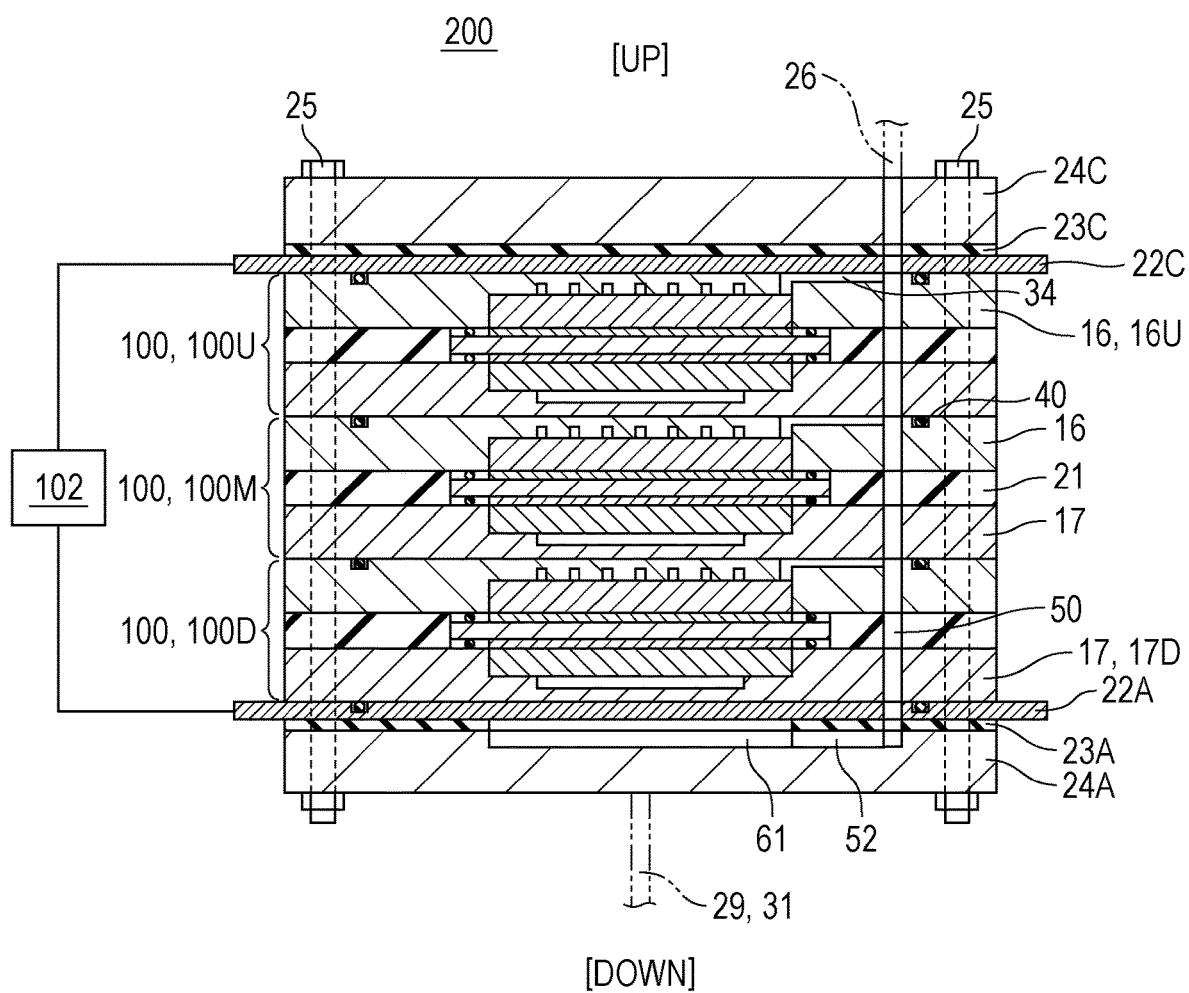
FIG. 8 is a view of an exemplary electrochemical hydrogen pump according to a third embodiment.

In FIG. 2A and FIG. 3A, the terms, "up" and "down", are described as well as in FIG. 7 and FIG. 8. "Up" and "down" in such figures are described as a matter of convenience for the following description, and the electrochemical hydrogen pump 200 may be placed in any direction relative to the gravity direction.

In examples in FIG. 2A and FIG. 3B, the electrochemical hydrogen pump 200 includes at least three or more hydrogen pump units 100.

In the electrochemical hydrogen pumps 200 in FIG. 2A and FIG. 3B, three hydrogen pump units 100U, 100M, and 100D are stacked on each other; however, the number of the hydrogen pump units 100 is not limited thereto. In other words, the number of the hydrogen pump units 100 can be appropriately determined in accordance with operating conditions, such as the amount of hydrogen pressurized by the electrochemical hydrogen pump 200.

The hydrogen pump units 100U, 100M, and 100D each include an electrolyte film 11, an anode AN, a cathode CA, a cathode separator 16, an anode separator 17, and an insulator 21.

The anode AN is disposed on one main surface of the electrolyte film 11. The anode AN is an electrode including an anode catalyst layer 13 and an anode gas diffusion layer 15. In plane view, an annular sealing member 43 is disposed so as to surround the periphery of the anode catalyst layer 13 and seal the anode catalyst layer 13 appropriately.

The cathode CA is disposed on the other main surface of the electrolyte film 11. The cathode CA is an electrode including a cathode catalyst layer 12 and a cathode gas diffusion layer 14. In plane view, an annular sealing member 42 is disposed so as to surround the periphery of the cathode catalyst layer 12 and seal the cathode catalyst layer 12 appropriately.

Accordingly, the electrolyte film 11 is sandwiched by the anode AN and the cathode CA so as to be in contact with the anode catalyst layer 13 and the cathode catalyst layer 12. The stack of the cathode CA, the electrolyte film 11, and the anode AN is referred to as a membrane electrode assembly (hereinafter, MEA).

The electrolyte film 11 has proton conductivity. The electrolyte film 11 may have any structure provided that the electrolyte film 11 has proton conductivity. Examples of the electrolyte film 11 include, but are not limited to, fluorine-based polymeric electrolyte films and hydrocarbon-based polymeric electrolyte films. Specifically, Nafion (trade name, manufactured by Du Pont) or Aciplex (trade name, manufactured by Asahi Kasei Corp.) may be used as the electrolyte film 11.

The anode catalyst layer 13 is disposed on one main surface of the electrolyte film 11. The anode catalyst layer 13 contains a catalytic metal, such as platinum; however, the catalytic metal is not limited thereto.

The cathode catalyst layer 12 is disposed on the other main surface of the electrolyte film 11. The cathode catalyst layer 12 contains a catalytic metal, such as platinum; however, the catalytic metal is not limited thereto.

Examples of catalyst carriers in the cathode catalyst layer 12 and the anode catalyst layer 13 include, but are not limited to, carbon powders, such as carbon black and graphite, and conductive oxide powders.

In the cathode catalyst layer 12 and the anode catalyst layer 13, highly dispersed catalytic metal particulates are supported on the catalyst carrier. To the cathode catalyst layer 12 and the anode catalyst layer 13, an ionomer constituent having hydrogen ion conductivity is typically added to increase the electrode reaction area.

The anode gas diffusion layer 15 is disposed on the anode catalyst layer 13 and contains a porous material. The anode gas diffusion layer 15 is conductive and has gas diffusivity. The anode gas diffusion layer 15 desirably has high stiffness and can suppress displacement and deformation of components due to a difference in pressure between the cathode CA and the anode AN during the operation of the electrochemical hydrogen pump 200. Accordingly, the elastic modulus of the anode gas diffusion layer 15 is higher than the elastic modulus of the cathode gas diffusion layer 14.

Examples of the base material of the anode gas diffusion layer 15 include sintered bodies of a metal fiber made of a material, such as titanium, a titanium alloy, or stainless steel, sintered bodies of a metal powder made of such a material, expanded metals, metal meshes, and punching metals.

The cathode gas diffusion layer 14 is disposed on the cathode catalyst layer 12 and contains a porous material. The cathode gas diffusion layer 14 is conductive and has gas diffusivity. The cathode gas diffusion layer 14 desirably has an elastic modulus so as to appropriately follow displacement and deformation of the components due to a difference in pressure between the cathode and the anode during the operation of the electrochemical hydrogen pump 200. Thus, the elastic modulus of the cathode gas diffusion layer 14 is lower than the elastic modulus of the anode gas diffusion layer 15.

Examples of the base material of the cathode gas diffusion layer 14 include sintered bodies of a metal fiber made of a material, such as titanium, a titanium alloy, or stainless steel, and sintered bodies of a metal powder made of such a material. The base material of the cathode gas diffusion layer 14 may be a porous carbon material, such as carbon paper, carbon cloth, or carbon felt. Furthermore, a porous sheet material obtained by kneading and rolling an elastomer, such as polytetrafluoroethylene (PTFE), and carbon black may be used.

The anode separator 17 is a member disposed on the anode gas diffusion layer 15. The cathode separator 16 is a member disposed on the cathode gas diffusion layer 14. Specifically, the cathode separator 16 has, in the center portion thereof, a recess in which the cathode gas diffusion layer 14 is disposed. The anode separator 17 has, in the center portion thereof, a recess in which the anode gas diffusion layer 15 is disposed. In other words, the cathode gas diffusion layer 14 and the anode gas diffusion layer 15 are respectively placed in the recess of the cathode separator 16 and the recess or the anode separator 17.

In such a way, the hydrogen pump unit 100 is formed by sandwiching the MEA between the cathode separator 16 and the anode separator 17.

In plane view, for example, a serpentine cathode gas flow channel 32 including a plurality of U-shaped curve portions and a plurality of straight portions is disposed in a main surface of the cathode separator 16 that is in contact with the cathode gas diffusion layer 14. The straight portions of the cathode gas flow channel 32 extend in a direction perpendicular to the sheet surface of FIG. 2A (a direction parallel to the sheet surface of FIG. 3A). The cathode gas flow channel 32 is an example, and the cathode gas flow channel is not limited thereto. For example, the cathode gas flow channel may include a plurality of straight channels.

In plane view, for example, a serpentine anode gas flow channel 33 including a plurality of U-shaped curve portions and a plurality of straight portions is disposed in a main surface of the anode separator 17 that is in contact with the anode gas diffusion layer 15. The straight portions of the anode gas flow channel 33 extend in a direction perpendicular to the sheet surface of FIG. 3A (a direction parallel to the sheet surface of FIG. 2A). The anode gas flow channel 33 is an example, and the anode gas flow channel is not limited thereto. For example, the anode gas flow channel may include a plurality of straight channels.

The annular plate-like insulator 21, which is disposed so as to surround the periphery of the MEA, is sandwiched between the conductive cathode separator 16 and the conductive anode separator 17. This prevents a short circuit between the cathode separator 16 and the anode separator 17.

As illustrated in FIG. 2A and FIG. 3A, the electrochemical hydrogen pump 200 includes a first end plate (hereinafter, cathode end plate 24C) and a second end plate (hereinafter, anode end plate 24A), which are disposed on respective ends of the hydrogen pump units 100 in a stacking direction, and a fastener 25, which fastens the cathode end plate 24C and the anode end plate 24A to compress the hydrogen pump unit 100 in the stacking direction.

In other words, the anode end plate 24A is a member disposed below an anode separator 17D at one end in a stacking direction in which the hydrogen pump units 100 are stacked on each other. The cathode end plate 24C is a member disposed above a cathode separator 16U at the other end in a stacking direction in which the hydrogen pump units 100 are stacked on each other.

The fastener 25 may have any structure provided that the fastener 25 can fasten the cathode end plate 24C and the anode end plate 24A to compress the hydrogen pump unit 100 in the stacking direction.

The fastener 25 may include a bolt and a nut with a disc spring. In such a case, the bolt of the fastener 25 may pass through only the anode end plate 24A and the cathode end plate 24C; however, in the electrochemical hydrogen pump 200, the bolt passes through each member of the hydrogen pump units 100U, 100M, and 100D, a cathode power feeder plate 22C, a cathode insulating plate 23C, an anode power feeder plate 22A, an anode insulating plate 23A, the anode end plate 24A, and the cathode end plate 24C. The fastener 25 applies a desired fastening pressure to the hydrogen pump units 100 sandwiched between the cathode end plate 24C and the anode end plate 24A in a state in which the cathode end plate 24C presses the top surface of the cathode separator 16U positioned at the other end in the stacking direction, with the cathode power feeder plate 22C and the cathode insulating plate 23C disposed between the cathode end plate 24C and the cathode separator 16U, and in which the anode end plate 24A presses the bottom surface of the anode separator 17D positioned at one end in the stacking direction, with the anode power feeder plate 22A and the anode insulating plate 23A disposed between the anode end plate 24A and the anode separator 17D.

Accordingly, in the electrochemical hydrogen pump 200 according to the present embodiment, the fastening pressure of the fastener 25 appropriately holds the multi-stacked (three in FIG. 2A and FIG. 3A) hydrogen pump units 100 in a stacked state in the stacking direction, and the bolt of the fastener 25 passes through each member in the electrochemical hydrogen pump 200. This appropriately suppresses movement of such members in an in-plane direction.

In the electrochemical hydrogen pump 200 according to the present embodiment, the cathode gas flow channels 32 in which the cathode gas flowing out from the cathode gas diffusion layer 14 in each of the hydrogen pump units 100U, 100M, and 100D flows are connected to each other. Hereinafter, the structure of the cathode gas flow channels 32 connected to each other will be described with reference to the drawings.

As illustrated in FIG. 2A, the cathode gas exhaust manifold 50 includes through holes formed in the cathode end plate 24C and the members in the hydrogen pump units 100U, 100M, and 100D and a non-through hole formed in the anode end plate 24A, and the through holes and the non-through hole are connected to each other. A cathode gas exhaust channel 26 is disposed on the cathode end plate 24C. The cathode gas exhaust channel 26 may include a pipe in which the hydrogen-containing gas discharged from the cathode CA flows. The cathode gas exhaust channel 26 is connected to the cathode gas exhaust manifold 50.

The cathode gas exhaust manifold 50 is connected to one end portion of the cathode gas flow channel 32 in each of the hydrogen pump units 100U, 100M, and 100D through a respective cathode gas passing channel 34. Accordingly, the hydrogen-containing gas that has passed through the cathode gas flow channel 32 and the cathode gas passing channel 34 in the hydrogen pump units 100U, the hydrogen-containing gas that has passed through the cathode gas flow channel 32 and the cathode gas passing channel 34 in the hydrogen pump unit 100M, and the hydrogen-containing gas that has passed through the cathode gas flow channel 32 and the cathode gas passing channel 34 in the hydrogen pump unit 100D join together in the cathode gas exhaust manifold 50. Then, the hydrogen-containing gas that has joined together is introduced to the cathode gas exhaust channel 26.

In such a way, the cathode gas flow channels 32 in the hydrogen pump units 100U, 100M, and 100D are connected to each other through the cathode gas passing channels 34 in the hydrogen pump units 100U, 100M, and 100D and the cathode gas exhaust manifold 50.

Between the cathode separator 16 and the anode separator 17, between the cathode separator 16U and the cathode power feeder plate 22C, and between the anode separator 17D and the anode power feeder plate 22A, annular sealing members 40, such as O rings, are disposed so as to surround the cathode gas exhaust manifold 50 in plane view and seal the cathode gas exhaust manifold 50 appropriately.

As illustrated in FIG. 3A, an anode gas intake channel 29 is disposed on the anode end plate 24A. The anode gas intake channel 29 may include a pipe in which the hydrogen-containing gas to be supplied to the anode AN flows. The anode gas intake channel 29 is connected to the cylindrical anode gas intake manifold 27. The anode gas intake manifold 27 includes through holes formed in the anode end plate 24A and the members in the hydrogen pump units 100U, 100M, and 100D, and the through holes are connected to each other.

The anode gas intake manifold 27 is connected to one end portion of the anode gas flow channel 33 in each of the hydrogen pump units 100U, 100M, and 100D through a respective first anode gas passing channel 35. Accordingly, the hydrogen-containing gas that has been supplied from the anode gas intake channel 29 to the anode gas intake manifold 27 is distributed to the hydrogen pump units 100U, 100M, and 100D through the respective first anode gas passing channels 35. While passing through the anode gas flow channel 33, the hydrogen-containing gas that has been distributed is supplied from the anode gas diffusion layer 15 to the anode catalyst layer 13.

As illustrated in FIG. 3A, an anode gas exhaust channel 31 is disposed on the anode end plate 24A. The anode gas exhaust channel 31 may include a pipe in which the hydrogen-containing gas discharged from the anode AN flows. The anode gas exhaust channel 31 is connected to the cylindrical anode gas exhaust manifold 30. The anode gas exhaust manifold 30 includes through holes formed in the anode end plate 24A and the members in the hydrogen pump units 100U, 100M, and 100D, and the through holes are connected to each other.

The anode gas exhaust manifold 30 is connected to the other end portion of the anode gas flow channel 33 in each of the hydrogen pump units 100U, 100M, and 100D through a respective second anode gas passing channel 36. Accordingly, the hydrogen-containing gas that has passed through the anode gas flow channel 33 in the hydrogen pump units 100U, the hydrogen-containing gas that has passed through the anode gas flow channel 33 in the hydrogen pump unit 100M, and the hydrogen-containing gas that has passed through the anode gas flow channel 33 in the hydrogen pump unit 100D are supplied through the respective second anode gas passing channel 36 to the anode gas exhaust manifold 30 and join together. Then, the hydrogen-containing gas that has joined together is introduced into the anode gas exhaust channel 31.

Between the cathode separator 16 and the anode separator 17, between the cathode separator 16U and the cathode power feeder plate 22C, and between the anode separator 17D and the anode power feeder plate 22A, the annular sealing members 40, such as O rings, are disposed so as to surround the anode gas intake manifold 27 and the anode gas exhaust manifold 30 in plane view and seal the anode gas intake manifold 27 and the anode gas exhaust manifold 30 appropriately.

As illustrated in FIG. 2A and FIG. 3A, the electrochemical hydrogen pump 200 includes a voltage applicator 102.

The voltage applicator 102 is a device that applies a voltage between the anode AN and the cathode CA. Specifically, the voltage applicator 102 applies a high potential to the conductive anode AN and a low potential to the conductive cathode CA. The voltage applicator 102 may have any structure provided that the voltage applicator 102 can apply a voltage between the anode AN and the cathode CA.

The voltage applicator 102 may be a device that adjusts the voltage applied between the anode AN and the cathode CA. In such a case, the voltage applicator 102 includes a DC/DC converter when connected to a direct-current power source, such as a battery, a solar cell, or a fuel cell, or includes an AC/DC converter when connected to an alternating-current power source, such as a commercial power source.

The voltage applicator 102 may be a wide-range power source in which a voltage applied between the anode AN and the cathode CA and a current that flows between the anode AN and the cathode CA are adjusted to supply a predetermined power to the hydrogen pump unit 100.

In examples illustrated in FIG. 2A and FIG. 3A, the low-potential terminal of the voltage applicator 102 is connected to the cathode power feeder plate 22C, and the high-potential terminal of the voltage applicator 102 is connected to the anode power feeder plate 22A. The cathode power feeder plate 22C is in an electrical contact with the cathode separator 16U positioned at the other end in the stacking direction. The anode power feeder plate 22A is in an electrical contact with the anode separator 17D positioned at one end in the stacking direction.

In the electrochemical hydrogen pump 200 according to the present embodiment, the amount of thickness reduction of the cathode gas diffusion layer 14 due to compression resulting from fastening of the fastener 25 is larger in the hydrogen pump unit 100 positioned at at least one end of the stacked hydrogen pump units 100 is larger than in the hydrogen pump unit 100 positioned at neither end of the stacked hydrogen pump units 100. The specific structure of such a cathode gas diffusion layer 14 will be described in a first example and a second example.

A hydrogen supply system (not shown) including the electrochemical hydrogen pump 200 can be established. In such a case, a device needed for hydrogen supply operation of the hydrogen supply system is appropriately disposed in the system.

The hydrogen supply system may include a dew point adjusting unit (e.g., humidifier) that adjusts the dew point of a gas mixture containing the hydrogen-containing gas having high humidity discharged from the anode AN through the anode gas exhaust channel 31 and the hydrogen-containing gas having low humidity supplied from an external hydrogen supplier through the anode gas intake channel 29. In such a case, the hydrogen-containing gas supplied from an external hydrogen supplier may be generated by a water electrolysis device.

The hydrogen supply system may include a temperature measuring unit that measures the temperature of the electrochemical hydrogen pump 200, a hydrogen storage unit that temporarily stores the hydrogen-containing gas discharged from the cathode CA in the electrochemical hydrogen pump 200, and a pressure measuring unit that measures the pressure of hydrogen-containing gas in the hydrogen storage unit.

The above structure of the electrochemical hydrogen pump 200 and various units and devices (not shown) in the hydrogen supply system are examples, and the present disclosure is not limited to the present examples.

A dead-end structure in which the anode gas exhaust manifold 30 and the anode gas exhaust channel 31 are not disposed and in which all the hydrogen-containing gas that has been supplied to the anode AN through the anode gas intake manifold 27 is pressurized in the cathode CA may be used.

The hydrogen-containing gas may be a gas having a hydrogen concentration of about 100% or a gas having a hydrogen concentration of less than 100%.

Operation

Hereinafter, an exemplary hydrogen pressurizing operation of the electrochemical hydrogen pump 200 will be described with reference to the drawings.

The following operation may be performed such that the arithmetic circuit of a controlling unit (not shown) reads out a controlling program from the memory circuit of the controlling unit. It is not necessary that the following operation be performed by a controlling unit. The following operation may be partially performed by an operator.

First, a low-pressure hydrogen-containing gas is supplied to the anode AN in the electrochemical hydrogen pump 200, and a voltage is applied by the voltage applicator 102 to the electrochemical hydrogen pump 200.

Then, in the anode catalyst layer 13 of the anode AN, a hydrogen molecule is separated by the oxidation reaction into hydrogen ions (protons) and electrons (Formula (1)). The protons transfer to the cathode catalyst layer 12 through the electrolyte film 11. The electrons transfer to the cathode catalyst layer 12 through the voltage applicator 102.

Then, in the cathode catalyst layer 12, a hydrogen molecule is regenerated by the reduction reaction (Formula (2)). It is known that when the protons transfer through the electrolyte film 11, a certain amount of water (i.e., electro-osmotic water) transfers with the protons from the anode AN to the cathode CA.

At this time, the hydrogen-containing gas generated in the cathode CA can be pressurized by increasing pressure loss in a hydrogen exhaust channel (e.g., cathode gas exhaust channel 26 in FIG. 2A) by using a flow-rate adjusting unit (not shown) (e.g., a back-pressure valve or a regulating valve disposed in a pipe).

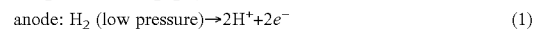
anode: $H_2$ (low pressure)$\rightarrow 2H^+ + 2e^-$ (1)

cathode: $2H^+ + 2e^- \rightarrow H_2$ (high pressure) (2)

In such a way, when a voltage is applied by the voltage applicator 102, the electrochemical hydrogen pump 200 pressurizes, in the cathode CA, the hydrogen-containing gas that has been supplied to the anode AN. Accordingly, hydrogen pressurizing operation of the electrochemical hydrogen pump 200 is performed, and the hydrogen-containing gas pressurized in the cathode CA is temporarily stored in, for example, a hydrogen storage unit (not shown). The hydrogen-containing gas stored in the hydrogen storage unit is timely supplied to a hydrogen demanding object. The hydrogen demanding object may be a fuel cell that generates power by using hydrogen in the hydrogen-containing gas.

In the above hydrogen pressurizing operation of the electrochemical hydrogen pump 200, the gas pressure of the cathode CA increases and presses the electrolyte film 11, the anode catalyst layer 13, and the anode gas diffusion layer 15. Then, due to such a pressing, the electrolyte film 11, the anode catalyst layer 13, and the anode gas diffusion layer 15 are compressed.

At this time, if adhesion between the cathode catalyst layer 12 and the cathode gas diffusion layer 14 is low, a gap is likely to be formed therebetween. If a gap is formed between the cathode catalyst layer 12 and the cathode gas diffusion layer 14, the contact resistance therebetween increases. Then, a voltage applied by the voltage applicator 102 increases, and this may cause degradation of the operation efficiency of the electrochemical hydrogen pump 200.

Before the hydrogen pump unit 100 is fastened by the fastener 25, the cathode gas diffusion layer 14 protrudes by a predetermined amount of protrusion from the recess of the cathode separator 16 in the thickness direction. When the hydrogen pump unit 100 is fastened, the cathode gas diffusion layer 14 is compressed by the amount of protrusion by the fastening force of the fastener 25.

According to such a structure, if the electrolyte film 11, the anode catalyst layer 13, and the anode gas diffusion layer 15 are each compressed and deform during the operation of the electrochemical hydrogen pump 200, the cathode gas diffusion layer 14 elastically deforms in a direction in which the thickness after the compression due to the fastener 25 returns to the original thickness before the compression, and thus, the contact between the cathode catalyst layer 12 and the cathode gas diffusion layer 14 is appropriately maintained in the electrochemical hydrogen pump 200 according to the present embodiment.

Furthermore, the electrochemical hydrogen pump 200 according to the present embodiment can readily and appropriately suppress an increase in the contact resistance between the cathode separator 16 and the cathode gas diffusion layer 14 in the hydrogen pump unit 100U, compared with that in the prior art. The electrochemical hydrogen pump 200 according to the present embodiment can readily and appropriately suppress an increase in the contact resistance between the cathode gas diffusion layer 14 and the electrolyte film 11 in the hydrogen pump unit 100D, compared with that in the prior art.

Specifically, when the gas pressure of the cathode gas diffusion layer 14 in the hydrogen pump unit 100 positioned at at least one end of the stacked hydrogen pump units 100 (in FIG. 2A and FIG. 3A, the upper hydrogen pump unit 100U in contact with the cathode power feeder plate 22C or the lower hydrogen pump unit 100D in contact with the anode power feeder plate 22A) increases, the separator of such a hydrogen pump unit 100 deforms so as to curve toward the end plate (outward).

When, for example, the gas pressure of the cathode gas diffusion layer 14 in the hydrogen pump unit 100U increases, the cathode separator 16U in the hydrogen pump unit 100U deforms so as to curve toward the cathode end plate 24C (outward). Then, in the hydrogen pump unit 100U, a gap is likely to be generated between the cathode separator 16U and the cathode gas diffusion layer 14.

When, for example, the gas pressure of the cathode gas diffusion layer 14 in the hydrogen pump unit 100D increases, a pressure is applied to the anode separator 17D in the hydrogen pump unit 100D through the anode gas diffusion layer 15. Thus, the anode separator 17D deforms so as to curve toward the anode end plate 24A (outward). Then, in the hydrogen pump unit 100D, a gap is likely to be generated between the cathode gas diffusion layer 14 and the electrolyte film 11 (in the cathode catalyst layer 12).

In the electrochemical hydrogen pump 200 according to the present embodiment, however, the amount of thickness reduction of the cathode gas diffusion layer 14 due to compression resulting from fastening of the fastener 25 is larger in the hydrogen pump units 100U and 100D than in the hydrogen pump unit 100 positioned neither end of the stacked hydrogen pump units 100 (middle hydrogen pump unit 100M in FIG. 2A and FIG. 3A).

Thus, if the cathode separator 16U in the hydrogen pump unit 100U deforms so as to curve toward the cathode end plate 24C (outward), the cathode gas diffusion layer 14 in the hydrogen pump unit 100U can elastically deform so as to follow the deformation of the cathode separator 16U in a direction in which the thickness after the compression due to the fastener 25 returns to the original thickness before the compression. Accordingly, the electrochemical hydrogen pump 200 according to the present embodiment can reduce the risk of gap generation between the cathode separator 16U and the cathode gas diffusion layer 14. As a result, the electrochemical hydrogen pump 200 according to the present embodiment can readily and appropriately suppress an increase in the contact resistance between the cathode separator 16U and the cathode gas diffusion layer 14 in the hydrogen pump unit 100U.

If the anode separator 17D in the hydrogen pump unit 100D deforms so as to curve toward the anode end plate 24A (outward), the cathode gas diffusion layer 14 in the hydrogen pump unit 100D can elastically deform so as to follow the deformation of the anode separator 17D in a direction in which the thickness after the compression due to the fastener 25 returns to the original thickness before the compression. Accordingly, the electrochemical hydrogen pump 200 according to the present embodiment can reduce the risk of gap generation between the cathode gas diffusion layer 14 and the electrolyte film 11 (in the cathode catalyst layer 12). As a result, the electrochemical hydrogen pump 200 according to the present embodiment can readily and appropriately suppress an increase in the contact resistance between the cathode gas diffusion layer 14 and the electrolyte film 11 in the hydrogen pump unit 100D.

In the electrochemical hydrogen pump 200 according to the present embodiment, as described above, the cathode gas flow channels 32 in which the cathode gas flowing out from the cathode gas diffusion layer 14 in each of the hydrogen pump units 100U, 100M, and 100D flows are connected to each other. Accordingly, the high-pressure hydrogen-containing gas in the hydrogen pump units 100U and 100D sandwiching the middle hydrogen pump unit 100M suppresses the deformation of the members in the hydrogen pump unit 100M. Thus, when the amount of thickness reduction of the cathode gas diffusion layer 14 due to compression resulting from fastening of the fastener 25 is smaller in the hydrogen pump unit 100M than in the hydrogen pump units 100U and 100D, a gap is unlikely to be generated between the members in the hydrogen pump unit 100M. In other words, when the amount of elastic deformation of the cathode gas diffusion layer 14 in a direction in which the thickness after the compression due to the fastener 25 returns to the original thickness before the compression is smaller in the hydrogen pump unit 100M than in the hydrogen pump units 100U and 100D, the risk of gap generation between the members in the hydrogen pump unit 100M can be reduced.

Accordingly, the electrochemical hydrogen pump 200 according to the present embodiment can readily and appropriately suppress an increase in the contact resistance between the members in the middle hydrogen pump unit 100M.

First Example

Figure 4A:
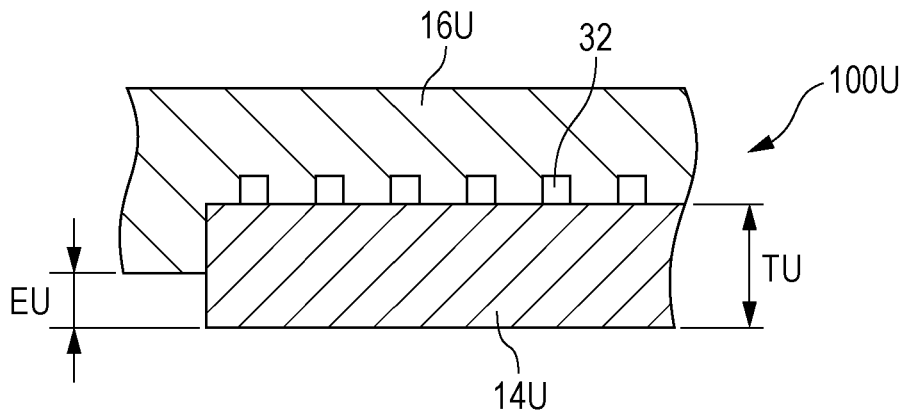
FIGS. 4A to 4C are views of an exemplary electrochemical hydrogen pump in a first example of the first embodiment.
Figure 4B:
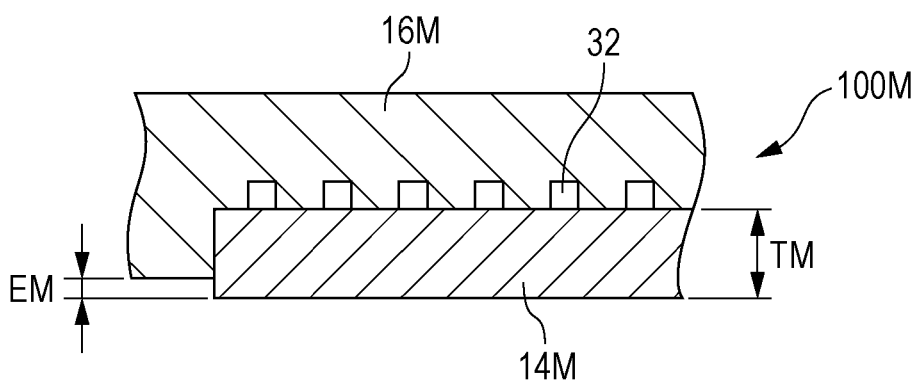
Figure 4C:
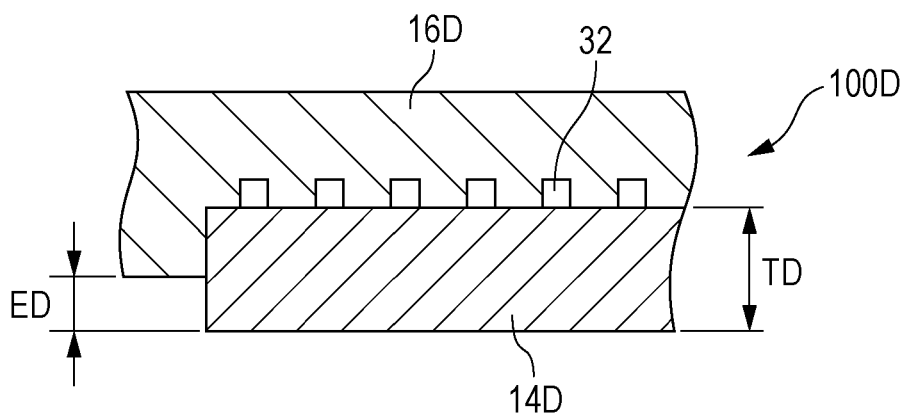

FIGS. 4A to 4C are views of an exemplary electrochemical hydrogen pump in a first example of the first embodiment.

FIG. 4A is a view of a cathode gas diffusion layer 14U protruding from the recess of the cathode separator 16U in the upper hydrogen pump unit 100U (see FIG. 2A and FIG. 3A) before fastening of the fastener 25.

FIG. 4B is a view of a cathode gas diffusion layer 14M protruding from the recess of a cathode separator 16M in the middle hydrogen pump unit 100M (see FIG. 2A and FIG. 3A) before fastening of the fastener 25.

FIG. 4C is a view of a cathode gas diffusion layer 14D protruding from the recess of a cathode separator 16D in the lower hydrogen pump unit 100D (see FIG. 2A and FIG. 3A) before fastening of the fastener 25.

In the electrochemical hydrogen pump 200 in the present example, as illustrated in FIG. 4A and FIG. 4B, before fastening of the fastener 25, the thickness TU of the cathode gas diffusion layer 14U in the hydrogen pump unit 100U is larger than the thickness TM of the cathode gas diffusion layer 14M in the hydrogen pump unit 100M. Thus, in such a case, when the depth of the recess of the cathode separator 16U is identical to the depth of the recess of the cathode separator 16M, the thickness EU of a portion of the cathode gas diffusion layer 14U that protrudes from the recess of the cathode separator 16U is larger than the thickness EM of a portion of the cathode gas diffusion layer 14M that protrudes from the recess of the cathode separator 16M, before fastening of the fastener 25.

In the electrochemical hydrogen pump 200 in the present example, as illustrated in FIG. 4B and FIG. 4C, before fastening of the fastener 25, the thickness TD of the cathode gas diffusion layer 14D in the hydrogen pump unit 100D is larger than the thickness TM of the cathode gas diffusion layer 14M in the hydrogen pump unit 100M. Thus, in such a case, when the depth of the recess of the cathode separator 16D is identical to the depth of the recess of the cathode separator 16M, the thickness ED of a portion of the cathode gas diffusion layer 14D that protrudes from the recess of the cathode separator 16D is larger than the thickness EM of a portion of the cathode gas diffusion layer 14M that protrudes from the recess of the cathode separator 16M, before fastening of the fastener 25.

According to such a structure, in the electrochemical hydrogen pump 200 in the present example, the amount of thickness reduction of the cathode gas diffusion layer 14U in the hydrogen pump unit 100U due to compression resulting from fastening of the fastener 25 can be appropriately larger than the amount of thickness reduction of the cathode gas diffusion layer 14M in the hydrogen pump unit 100M due to compression resulting from fastening of the fastener 25. The amount of thickness reduction of the cathode gas diffusion layer 14D in the hydrogen pump unit 100D due to compression resulting from fastening of the fastener 25 can be appropriately larger than the amount of thickness reduction of the cathode gas diffusion layer 14M in the hydrogen pump unit 100M due to compression resulting from fastening of the fastener 25.

The electrochemical hydrogen pump 200 in the present example may be identical to the electrochemical hydrogen pump 200 according to the first embodiment, except for the above feature.

Second Example

Figure 5A:
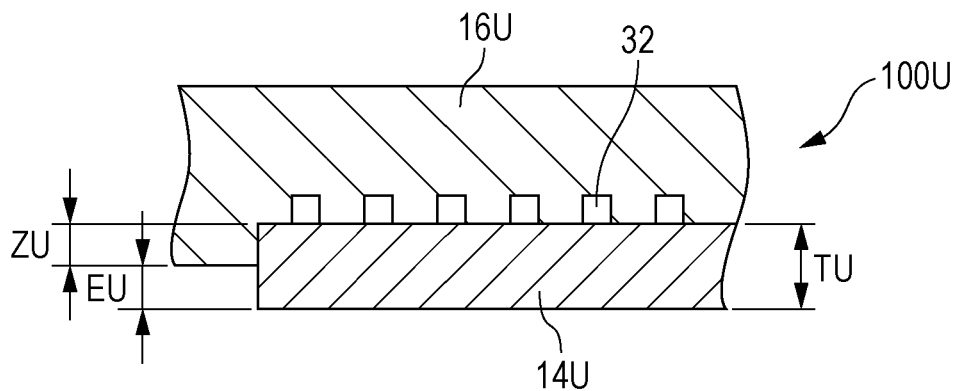
FIGS. 5A to 5C are views of an exemplary electrochemical hydrogen pump in a second example of the first embodiment.
Figure 5B:
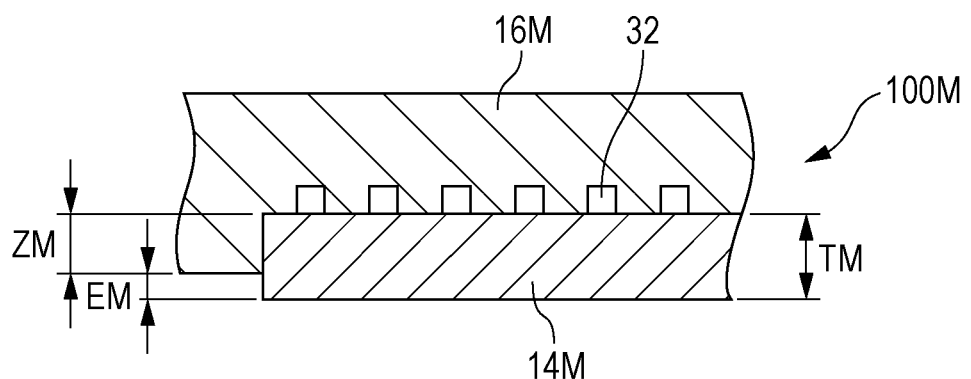
Figure 5C:
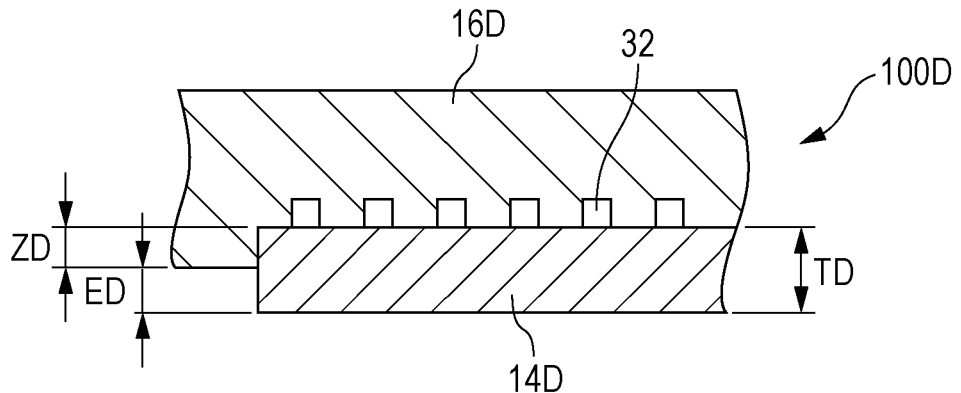

FIGS. 5A to 5C are views of an exemplary electrochemical hydrogen pump in a second example of the first embodiment.

FIG. 5A is a view of the cathode gas diffusion layer 14U protruding from the recess of the cathode separator 16U in the upper hydrogen pump unit 1000 (see FIG. 2A and FIG. 3A) before fastening of the fastener 25.

FIG. 5B is a view of the cathode gas diffusion layer 14M protruding from the recess of the cathode separator 16M in the middle hydrogen pump unit 100M (see FIG. 2A and FIG. 3A) before fastening of the fastener 25.

FIG. 5C is a view of the cathode gas diffusion layer 14D protruding from the recess of the cathode separator 16D in the lower hydrogen pump unit 100D (see FIG. 2A and FIG. 3A) before fastening of the fastener 25.

In the electrochemical hydrogen pump 200 in the present example, as illustrated in FIG. 5A and FIG. 5B, the depth ZU of the recess of the cathode separator 16U in the hydrogen pump unit 100U is smaller than the depth ZM of the recess of the cathode separator 16M in the hydrogen pump unit 100M. Thus, in such a case, when the thickness TU of the cathode gas diffusion layer 14U is identical to the thickness TM of the cathode gas diffusion layer 14M before fastening of the fastener 25, the thickness EU of a portion of the cathode gas diffusion layer 14U that protrudes from the recess of the cathode separator 16U is larger than the thickness EM of a portion of the cathode gas diffusion layer 14M that protrudes from the recess of the cathode separator 16M in the hydrogen pump unit 100M, before fastening of the fastener 25.

In the electrochemical hydrogen pump 200 in the present example, as illustrated in FIG. 5B and FIG. 5C, the depth ZD of the recess of the cathode separator 16D in the hydrogen pump unit 100D is smaller than the depth ZM of the recess of the cathode separator 16M in the hydrogen pump unit 100M. Thus, in such a case, when the thickness TD of the cathode gas diffusion layer 14D is identical to the thickness TM of the cathode gas diffusion layer 14M before fastening of the fastener 25, the thickness ED of a portion of the cathode gas diffusion layer 14D that protrudes from the recess of the cathode separator 16D is larger than the thickness EM of a portion of the cathode gas diffusion layer 14M that protrudes from the recess of the cathode separator 16M in the hydrogen pump unit 100M, before fastening of the fastener 25.

According to such a structure, in the electrochemical hydrogen pump 200 in the present example, when the thickness TU of the cathode gas diffusion layer 14U in the hydrogen pump unit 1000 is identical to the thickness TM of the cathode gas diffusion layer 14M in the hydrogen pump unit 100M, the amount of thickness reduction of the cathode gas diffusion layer 14U due to compression resulting from fastening of the fastener 25 can be appropriately larger than the amount of thickness reduction of the cathode gas diffusion layer 14M due to compression resulting from fastening of the fastener 25. When the thickness TD of the cathode gas diffusion layer 14D in the hydrogen pump unit 100D is identical to the thickness TM of the cathode gas diffusion layer 14M in the hydrogen pump unit 100M, the amount of thickness reduction of the cathode gas diffusion layer 14D due to compression resulting from fastening of the fastener 25 can be appropriately larger than the amount of thickness reduction of the cathode gas diffusion layer 14M due to compression resulting from fastening of the fastener 25.

The electrochemical hydrogen pump 200 in the present example may be identical to the electrochemical hydrogen pump 200 according to the first embodiment or the electrochemical hydrogen pump 200 in the first example of the first embodiment, except for the above feature.

First Modified Example

The electrochemical hydrogen pump 200 in the present modified example is identical to any one of the electrochemical hydrogen pump 200 according to the first embodiment and the electrochemical hydrogen pumps 200 in the first and second examples of the first embodiment, except that the cathode gas diffusion layer 14 in the hydrogen pump unit 100 positioned at at least one end of the stacked hydrogen pump units 100 has a protrusion on a main surface thereof that is adjacent to the cathode separator 16.

Figure 6A:
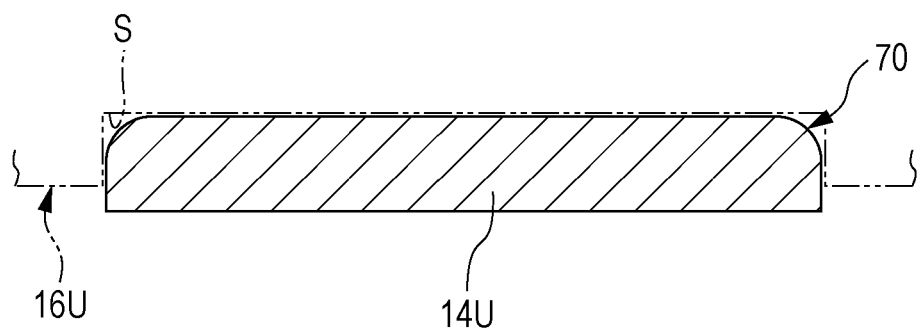
FIG. 6A is a view of an exemplary electrochemical hydrogen pump in a first modified example of the first embodiment.
Figure 6B:
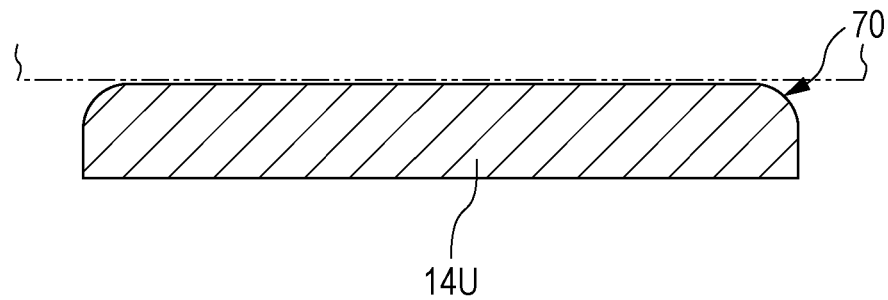
FIG. 6B is a view of an exemplary electrochemical hydrogen pump in the first modified example of the first embodiment.

FIG. 6A and FIG. 6B are each a view of an exemplary electrochemical hydrogen pump in a first modified example of the first embodiment.

As described above, when the gas pressure of the cathode gas diffusion layer 14U in the upper hydrogen pump unit 100U adjacent to the cathode end plate 24C increases, the cathode separator 16U deforms so as to curve toward the cathode end plate 24C (outward). Then, a main surface S of the cathode separator 16U that is adjacent to the cathode gas diffusion layer 14U deforms due to the high-pressure hydrogen-containing gas such that the amount of deformation in the center portion is larger than the amount of deformation in the end portions. In other words, the main surface S of the cathode separator 16U deforms to have a dome shape due to the high-pressure hydrogen-containing gas.

Such a phenomenon occurs in the cathode separator 16U having a recess in which the cathode gas diffusion layer 14U is disposed, as illustrated in FIG. 6A, and in a cathode separator having no recesses, as illustrated in FIG. 6B.

In the electrochemical hydrogen pump 200 in the present modified example, the cathode gas diffusion layer 14U has a protrusion 70 on a main surface thereof that is adjacent to the cathode separator 16U. Thus, the main surface of the cathode gas diffusion layer 14U is likely to adhere to the main surface S of the cathode separator 16U if the main surface S deforms to have a dome shape due to the high-pressure hydrogen-containing gas. Therefore, the electrochemical hydrogen pump 200 in the present modified example can reduce the risk of gap generation between the cathode separator 16U and the cathode gas diffusion layer 14U, compared with an electrochemical hydrogen pump in which the cathode gas diffusion layer 14U does not have the protrusion 70 on the main surface thereof.

The electrochemical hydrogen pump 200 in the present modified example may be identical to any one of the electrochemical hydrogen pump 200 according to the first embodiment and the electrochemical hydrogen pumps 200 in the first and second examples of the first embodiment, except for the above feature.

Second Modified Example

The electrical resistance of the cathode gas diffusion layer 14 in the thickness direction is proportional to the thickness of the cathode gas diffusion layer 14. The thickness reduction of the cathode gas diffusion layers 14 due to compression resulting from fastening of the fastener 25 is larger in the upper hydrogen pump unit 100U and the lower hydrogen pump unit 100D than in the middle hydrogen pump unit 100M. Accordingly, with fastening of the fastener 25, the electrical resistance of the cathode gas diffusion layer 14 in the thickness direction is more likely to decrease in the hydrogen pump units 100U and 100D than in the hydrogen pump unit 100M.

In the electrochemical hydrogen pump 200 in the present modified example, before fastening of the fastener 25, the electrical resistance of the cathode gas diffusion layer 14 in the thickness direction is higher in the hydrogen pump units 100 positioned at least one end of the stacked hydrogen pump units 100 (hydrogen pump unit 100U, 100D in FIG. 2A and FIG. 3A) than in the hydrogen pump unit 100 positioned at neither end of the stacked hydrogen pump units 100 (hydrogen pump unit 100M in FIG. 2A and FIG. 3A).

To increase or decrease the electrical resistance of the cathode gas diffusion layer 14 in the thickness direction before fastening of the fastener 25, any feature of the cathode gas diffusion layer 14 may be changed. For example, changing the porosity of the porous cathode gas diffusion layer 14 leads to an increase or decrease in the electrical resistance of the cathode gas diffusion layer 14 in the thickness direction. In other words, in such a case, the porosity of the cathode gas diffusion layers 14 may be higher in the hydrogen pump units 100U and 100D than in the hydrogen pump unit 100M before fastening of the fastener 25.

For example, changing the material of the cathode gas diffusion layer 14 leads to an increase or decrease in the electrical resistance of the cathode gas diffusion layer 14 in the thickness direction. In other words, in such a case, the electrical resistivity of the material of the cathode gas diffusion layer 14 may be higher in the hydrogen pump unit 100M than in the hydrogen pump units 100U and 100D.

According to such a structure, the electrochemical hydrogen pump 200 in the present modified example is likely to equalize the electrical resistances of the cathode gas diffusion layers 14 in the thickness direction in the hydrogen pump units 100U, 100M, and 100D during fastening of the fastener 25.

In other words, decreases in the electrical resistance of the cathode gas diffusion layers 14 in the thickness direction in the hydrogen pump units 100U, 100M, and 100D vary due to fastening of the fastener 25; however, in the electrochemical hydrogen pump 200 according to the present modified example, such a variation can be reduced because the electrical resistances of the cathode gas diffusion layers 14 in the thickness direction in the hydrogen pump units 100U, 100M, and 100D are unequal before fastening of the fastener 25.

Therefore, the electrochemical hydrogen pump 200 in the present modified example can equalize the electrical resistance of the cathode gas diffusion layers 14 in the thickness direction in the hydrogen pump units 100U, 100M, and 100D during fastening of the fastener 25, compared with an electrochemical hydrogen pump in which the electrical resistances of the cathode gas diffusion layers 14 in the thickness direction in the hydrogen pump units 100U, 100M, and 100D are equal before fastening of the fastener 25.

If the electrical resistances of the cathode gas diffusion layers 14 in the thickness direction in the hydrogen pump units 100U, 100M, and 100D are not equal during fastening of the fastener 25, during the operation of the electrochemical hydrogen pump 200 (i.e., while current is applied), the amounts of heat generation in the hydrogen pump units 100U, 100M, and 100D differ from each other. Thus, the operation temperatures in the hydrogen pump units 100U, 100M, and 100D may differ from each other. However, according to the above structure, the electrochemical hydrogen pump 200 in the present modified example can reduce such a risk.

The electrochemical hydrogen pump 200 in the present modified example may be identical to any one of the electrochemical hydrogen pump 200 according to the first embodiment and the electrochemical hydrogen pumps 200 in the first, second, and first modified examples of the first embodiment, except for the above feature.

Second Embodiment

FIG. 7 is a view of an exemplary electrochemical hydrogen pump according to a second embodiment.

FIG. 7 is a vertical cross-sectional view of the electrochemical hydrogen pump 200 including a straight line passing through the center of the electrochemical hydrogen pump 200 and the center of the cathode gas exhaust manifold 50 in plane view.

The electrochemical hydrogen pump 200 according to the present embodiment is identical to the electrochemical hydrogen pump 200 according to the first embodiment, except that a first space 60 and a first gas flow channel that will be described later are included and that the amount of thickness reduction of the cathode gas diffusion layer 14 (see FIG. 2B) due to compression resulting from fastening of the fastener 25 in the upper hydrogen pump unit 100U differs from that in the lower hydrogen pump unit 100D.

In the electrochemical hydrogen pump 200 according to the present embodiment, between the cathode end plate 24C and the hydrogen pump unit 100U positioned at an end of the hydrogen pump units 100 that is adjacent to the cathode end plate 24C, the first space 60 that stores the hydrogen-containing gas discharged from the cathode gas flow channel 32 is formed.

The electrochemical hydrogen pump 200 includes a first gas flow channel through which the hydrogen-containing gas generated in the cathode CA is supplied to the first space 60, which is disposed between the cathode end plate 24C and the cathode separator 16U in the hydrogen pump unit 100U.

The first space 60 may be any space provided that such a space is formed between the cathode end plate 24C and the cathode separator 16U. The first gas flow channel may have any structure provided that hydrogen generated in the cathode CA is supplied to the first space 60 through the first gas flow channel.

For example, as illustrated in FIG. 7, in the electrochemical hydrogen pump 200 according to the present embodiment, the first gas flow channel includes the cylindrical cathode gas exhaust manifold 50 and a cathode gas supplying channel 51 that connects the cathode gas exhaust manifold 50 and the first space 60 to each other.

The first space 60 includes a recess disposed in the center portion of the cathode end plate 24C and the opening formed in the center portion of the cathode insulating plate 23C.

The cathode gas supplying channel 51 includes a groove formed in the main surface of the cathode end plate 24C that connects the recess (first space 60) in the cathode end plate 24C and an end portion of the cathode gas exhaust manifold 50 to each other.

According to such a structure, the electrochemical hydrogen pump 200 according to the present embodiment can supply the high-pressure hydrogen-containing gas generated in the cathodes CA in the hydrogen pump units 100 to the first space 60 formed between the cathode end plate 24C and the cathode separator 16 through the cathode gas exhaust manifold 50 and the cathode gas supplying channel 51. In other words, the electrochemical hydrogen pump 200 according to the present embodiment can retain the high-pressure hydrogen-containing gas in the first space 60.

The pressure of the hydrogen-containing gas in the first space 60 formed between the hydrogen pump unit 100U and the cathode end plate 24C is high and nearly identical to the pressure of the hydrogen-containing gas in the cathode CA in the hydrogen pump unit 100. Then, a load is applied to the cathode separator 16U in the hydrogen pump unit 100U by the hydrogen-containing gas in the first space 60 so as to suppress deformation (flexure) of the cathode separator 16U due to the pressure of the hydrogen-containing gas in the cathode CA.

On the other hand, between the hydrogen pump unit 100D and the anode end plate 24A, there is no space that stores the high-pressure hydrogen-containing gas having a pressure nearly identical to the pressure of the hydrogen-containing gas in the cathode CA in the hydrogen pump unit 100. Thus, a load that can suppress deformation (flexure) of the anode separator 17D due to the pressure of the hydrogen-containing gas in the cathode CA is not applied to the anode separator 17D in the hydrogen pump unit 100D. In other words, in the hydrogen pump unit 100D, due to the pressure of the hydrogen-containing gas in the cathode CA, a gap is more likely to be generated between the members in the hydrogen pump unit 100D than in the hydrogen pump unit 100U.

In the electrochemical hydrogen pump 200 according to the present embodiment, the amount of thickness reduction of the cathode gas diffusion layer 14 due to compression resulting from fastening of the fastener 25 is larger in the hydrogen pump unit 100D than in the hydrogen pump unit 100U. In such a case, the amount of thickness reduction of the cathode gas diffusion layer 14 due to compression resulting from fastening of the fastener 25 in the hydrogen pump unit 100U may be nearly identical to that in the hydrogen pump unit 100M.

Accordingly, the electrochemical hydrogen pump 200 according to the present embodiment can reduce the risk of gap generation between the members in the hydrogen pump unit 100D.

The electrochemical hydrogen pump 200 according to the present embodiment may be identical to any one of the electrochemical hydrogen pump 200 according to the first embodiment and the electrochemical hydrogen pumps 200 in the first, second, first modified, and second modified examples of the first embodiment, except for the above feature.

Third Embodiment

FIG. 8 is a view of an exemplary electrochemical hydrogen pump according to the third embodiment.

FIG. 8 is a vertical cross-sectional view of the electrochemical hydrogen pump 200 including a straight line passing through the center of the electrochemical hydrogen pump 200 and the center of the cathode gas exhaust manifold 50 in plane view.

The electrochemical hydrogen pump 200 according to the present embodiment is identical to the electrochemical hydrogen pump 200 according to the first embodiment, except that a second space 61 and a second gas flow channel that will be described later are included and that the amount of thickness reduction of the cathode gas diffusion layer 14 (see FIG. 2B) due to compression resulting from fastening of the fastener 25 in the upper hydrogen pump unit 100U differs from that in the lower hydrogen pump unit 100D.

In the electrochemical hydrogen pump 200 according to the present embodiment, between the anode end plate 24A and the hydrogen pump unit 100D positioned at an end of the hydrogen pump units 100 adjacent to the anode end plate 24A, the second space 61 that stores the hydrogen-containing gas discharged from the cathode gas flow channel 32 is formed.

The electrochemical hydrogen pump 200 includes a second gas flow channel through which the hydrogen-containing gas generated in the cathode CA is supplied to the second space 61 formed between the anode end plate 24A and the anode separator 17D in the hydrogen pump unit 100D.

The second space 61 may be any space provided that such a space is formed between the anode end plate 24A and the anode separator 17D. The second gas flow channel may have any structure provided that hydrogen generated in the cathode CA is supplied to the second space 61 through the second gas flow channel.

For example, as illustrated in FIG. 8, in the electrochemical hydrogen pump 200 according to the present embodiment, the second gas flow channel includes the cylindrical cathode gas exhaust manifold 50 and a cathode gas supplying channel 52 that connects the cathode gas exhaust manifold 50 and the second space 61 to each other.

The second space 61 includes a recess disposed in the center portion of the anode end plate 24A and the opening formed in the center portion of the anode insulating plate 23A.

The cathode gas supplying channel 52 includes a groove formed in the main surface of the anode end plate 24A that connects the recess (second space 61) in the anode end plate 24A and an end portion of the cathode gas exhaust manifold 50 to each other.

According to such a structure, the electrochemical hydrogen pump 200 according to the present embodiment can supply the high-pressure hydrogen-containing gas generated in the cathodes CA in the hydrogen pump units 100 to the second space 61 formed between the anode end plate 24A and the anode separator 17D through the cathode gas exhaust manifold 50 and the cathode gas supplying channel 52. In other words, the electrochemical hydrogen pump 200 according to the present embodiment can retain the high-pressure hydrogen-containing gas in the second space 61.

The pressure of the hydrogen-containing gas in the second space 61 formed between the hydrogen pump unit 100D and the anode end plate 24A is high and nearly identical to the pressure of the hydrogen-containing gas in the cathode CA in the hydrogen pump unit 100. Then, a load is applied to the anode separator 17D in the hydrogen pump unit 100D by the hydrogen-containing gas in the second space 61 so as to suppress deformation (flexure) of the anode separator 17D due to the pressure of the hydrogen-containing gas in the cathode CA.

On the other hand, between the hydrogen pump unit 100U and the cathode end plate 24C, there is no space that stores the high-pressure hydrogen-containing gas having a pressure nearly identical to the pressure of the hydrogen-containing gas in the cathode CA in the hydrogen pump unit 100. Thus, a load that can suppress deformation (flexure) of the cathode separator 16U due to the pressure of the hydrogen-containing gas in the cathode CA is not applied to the cathode separator 16U in the hydrogen pump unit 100U. In other words, in the hydrogen pump unit 100U, due to the pressure of the hydrogen-containing gas in the cathode CA, a gap is more likely to be generated between the members in the hydrogen pump unit 100U than in the hydrogen pump unit 100D.

In the electrochemical hydrogen pump 200 according to the present embodiment, the amount of thickness reduction of the cathode gas diffusion layer 14 due to compression resulting from fastening of the fastener 25 is larger in the hydrogen pump unit 100U than in the hydrogen pump unit 100D. In such a case, the amount of thickness reduction of the cathode gas diffusion layer 14 due to compression resulting from fastening of the fastener 25 in the hydrogen pump unit 100D may be nearly identical to that in the hydrogen pump unit 100M.

Accordingly, the electrochemical hydrogen pump 200 according to the present embodiment can reduce the risk of gap generation between the members in the hydrogen pump unit 100U.

The electrochemical hydrogen pump 200 according to the present embodiment may be identical to any one of the electrochemical hydrogen pump 200 according to the first embodiment and the electrochemical hydrogen pumps 200 in the first, second, first modified, and second modified examples of the first embodiment, except for the above feature.

The first embodiment, the first and second examples of the first embodiment, the first modified and second modified examples of the first embodiment, the second embodiment, and the third embodiment may be combined with each other provided that they are compatible with each other.

From the above description, those skilled in the art will appreciate numerous modifications and other embodiments of the present disclosure. Accordingly, the above description is understood to be illustrative only and is provided to teach those skilled in the art the best mode to perform the present disclosure. The structure and/or function may be substantially changed within the spirit of the present disclosure.

An aspect of the present disclosure can be applied to an electrochemical hydrogen pump that can readily and appropriately suppress an increase, compared with that in the prior art, in the contact resistance between the members in the hydrogen pump unit.

What is claimed is:

1. An electrochemical hydrogen pump comprising three hydrogen pump units, each of the three hydrogen pump units including:
    an electrolyte film, an anode catalyst layer disposed on one main surface of the electrolyte film, a cathode catalyst layer disposed on another main surface of the electrolyte film, an anode gas diffusion layer disposed on the anode catalyst layer, an anode separator disposed on the anode gas diffusion layer, a cathode gas diffusion layer disposed on the cathode catalyst layer, and a cathode separator disposed on the cathode gas diffusion layer;
    a first end plate and a second end plate that are disposed on respective ends of the three hydrogen pump units stacked on each other in a stacking direction;
    a fastener that fastens the first end plate and the second end plate to compress the three hydrogen pump units in the stacking direction; and
    a voltage applicator that applies a voltage between the anode catalyst layer and the cathode catalyst layer of each of the three hydrogen pump units, the electrochemical hydrogen pump transferring, to each cathode catalyst layer, hydrogen in a hydrogen-containing gas that has been supplied to each anode catalyst layer and pressurizing the hydrogen, when a voltage is applied by the voltage applicator,
    wherein cathode gas flow channels in which a cathode gas flowing out from the cathode gas diffusion layer in each of the three hydrogen pump units stacked on each other flows are connected to each other, and
    an amount of thickness reduction of the cathode gas diffusion layer due to compression resulting from fastening of the fastener is larger in the hydrogen pump unit positioned at at least one end of the stacked hydrogen pump units than in the hydrogen pump unit positioned at neither end of the stacked hydrogen pump units.

2. The electrochemical hydrogen pump according to claim 1, wherein before fastening of the fastener, a thickness of the cathode gas diffusion layer is larger in the hydrogen pump unit positioned at at least one end of the stacked hydrogen pump units than in the hydrogen pump unit positioned at neither end of the stacked hydrogen pump units.

3. The electrochemical hydrogen pump according to claim 1, wherein:
   in each of the three hydrogen pump units, the cathode separator has a recess in which the cathode gas diffusion layer is disposed, and
   before fastening of the fastener, a thickness of a portion of the cathode gas diffusion layer that protrudes from the recess of the cathode separator is larger in the hydrogen pump unit positioned at at least one end of the stacked hydrogen pump units than in the hydrogen pump unit positioned at neither end of the stacked hydrogen pump units.

4. The electrochemical hydrogen pump according to claim 3, wherein a depth of the recess of the cathode separator is smaller in the hydrogen pump unit positioned at at least one end of the stacked hydrogen pump units than in the hydrogen pump unit positioned at neither end of the stacked hydrogen pump units.

5. The electrochemical hydrogen pump according to claim 1, wherein:
   the cathode gas diffusion layer in the hydrogen pump unit positioned at at least one end of the stacked hydrogen pump units includes a first main surface that is adjacent to the cathode separator, and
   a protrusion is provided on the first main surface of the cathode gas diffusion layer.

6. The electrochemical hydrogen pump according to claim 1,
   wherein before fastening of the fastener, an electrical resistance of the cathode gas diffusion layer in a thickness direction is higher in the hydrogen pump unit positioned at at least one end of the stacked hydrogen pump units than in the hydrogen pump unit positioned at neither end of the stacked hydrogen pump units.

7. The electrochemical hydrogen pump according to claim 1, wherein:
   the three hydrogen pump units includes a first end hydrogen pump unit and a second end hydrogen pump unit at ends of the hydrogen pump units,
   between the first end plate and the first end hydrogen pump unit that is adjacent to the first end plate, a first space that stores the hydrogen-containing gas discharged from the cathode gas flow channel is formed, and
   the amount of thickness reduction of the cathode gas diffusion layer due to compression resulting from fastening of the fastener is larger in the second end hydrogen pump unit than in the first end hydrogen pump unit.

8. The electrochemical hydrogen pump according to claim 1, wherein:
   the three hydrogen pump units includes a first end hydrogen pump unit and a second end hydrogen pump unit at ends of the hydrogen pump units,
   between the second end plate and the second end hydrogen pump unit that is adjacent to the second end plate, a second space that stores the hydrogen-containing gas discharged from the cathode gas flow channel is formed, and
   the amount of thickness reduction of the cathode gas diffusion layer due to compression resulting from fastening of the fastener is larger in the first end hydrogen pump unit than in the second end hydrogen pump unit.

* * * * *